(12) United States Patent
Shimizu et al.

(10) Patent No.: US 10,379,901 B2
(45) Date of Patent: Aug. 13, 2019

(54) APPARATUS AND METHOD TO SELECT TRANSMISSION SOURCES AND DESTINATIONS ALLOWING ALL-TO-ALL COMMUNICATION WITHOUT LINK CONGESTION IN A NETWORK INCLUDING PLURAL TOPOLOGICAL STRUCTURES

(71) Applicant: FUJITSU LIMITED, Kawasaki-shi, Kanagawa (JP)

(72) Inventors: Toshihiro Shimizu, Kawasaki (JP); Kohta Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 19 days.

(21) Appl. No.: 15/790,221

(22) Filed: Oct. 23, 2017

(65) Prior Publication Data
US 2018/0113739 A1 Apr. 26, 2018

(30) Foreign Application Priority Data
Oct. 25, 2016 (JP) .................. 2016-209012

(51) Int. Cl.
*G06F 9/48* (2006.01)
*G06F 9/54* (2006.01)
(Continued)

(52) U.S. Cl.
CPC ............ *G06F 9/4881* (2013.01); *G06F 9/546* (2013.01); *G06F 13/4063* (2013.01);
(Continued)

(58) Field of Classification Search
CPC .......................... H04L 12/6402; G06F 9/4881
(Continued)

(56) References Cited

U.S. PATENT DOCUMENTS

| 9,983,970 B2 * | 5/2018 | Brooks .............. G06F 11/3051 |
| 2012/0233621 A1 | 9/2012 | Doi et al. |
| 2014/0245324 A1 | 8/2014 | Minkenberg et al. |

FOREIGN PATENT DOCUMENTS

| JP | 2013-37723 | 2/2013 |
| JP | 2014-164756 | 9/2014 |

OTHER PUBLICATIONS

M. Valerio, et al. "Using Fat-Trees to Maximize the Number of Processors in a Massively Parallel Computer", IEEE Computer Society, 1993, 7 pages.

(Continued)

*Primary Examiner* — Jeffrey M Rutkowski
*Assistant Examiner* — Sudesh M Patidar
(74) *Attorney, Agent, or Firm* — Xsensus LLP

(57) ABSTRACT

First information includes a sequence of first picking-numbers and a sequence of first sets including input-port identification values for a second number of first topological structures. Second information includes a sequence of second picking-numbers and a sequence of second sets including output-port identification values for a first number of second topological structures. Based on the first and second information, an apparatus determines first and second target picking-numbers so that a product of the first and second target picking-numbers is equal to or greater than a given number smaller than a product of the first and second numbers. The apparatus determines picking-target transmission sources and destinations between which all-to-all communication is to be performed without link congestion, from plural transmission sources and plural transmission destinations, based on the first target picking-number of input-port identification values and the second target picking-number of output-port identification values.

8 Claims, 18 Drawing Sheets

(51) Int. Cl.
  *G06F 13/40*  (2006.01)
  *H04L 12/64*  (2006.01)
  *G06F 7/38*  (2006.01)
(52) U.S. Cl.
  CPC ............ *H04L 12/6402* (2013.01); *G06F 7/38* (2013.01); *Y02D 10/14* (2018.01); *Y02D 10/151* (2018.01)
(58) Field of Classification Search
  USPC ....................................................... 370/401
  See application file for complete search history.

(56) References Cited

OTHER PUBLICATIONS

Toshihiro Shimizu, et al. "Acceleration of All-to-all Communication in Latin Square Fat-Tree, Low Cost Scalable Network Topology." Information Processing Society of Japan, vol. 53, No. 10, 2012, 20 pages (with English Translation).

\* cited by examiner

FIG. 3

| TRANSMISSION SOURCE \ DESTINATION | t0 | t1 | t2 | t3 | t4 | t5 | t6 | t7 | t8 |
|---|---|---|---|---|---|---|---|---|---|
| s0 | p0 | p0 | p0 | p0 | p0 | p0 | p0 | p0 | p0 |
| s1 | p1 | p1 | p1 | p1 | p1 | p1 | p1 | p1 | p1 |
| s2 | p2 | p2 | p2 | p2 | p2 | p2 | p2 | p2 | p2 |
| s3 | - | - | - | - | - | - | - | - | - |
| s4 | - | - | - | - | - | - | - | - | - |
| s5 | - | - | - | - | - | - | - | - | - |
| s6 | - | - | - | - | - | - | - | - | - |
| s7 | - | - | - | - | - | - | - | - | - |
| s8 | - | - | - | - | - | - | - | - | - |

APPARATUS AND METHOD TO SELECT TRANSMISSION SOURCES AND DESTINATIONS ALLOWING ALL-TO-ALL COMMUNICATION WITHOUT LINK CONGESTION IN A NETWORK INCLUDING PLURAL TOPOLOGICAL STRUCTURES

CROSS-REFERENCE TO RELATED APPLICATION

This application is based upon and claims the benefit of priority of the prior Japanese Patent Application No. 2016-209012, filed on Oct. 25, 2016, the entire contents of which are incorporated herein by reference.

FIELD

The embodiment discussed herein is related to apparatus and method to select transmission sources and destinations allowing all-to-all communication without link congestion in a network including plural topological structures.

BACKGROUND

In the related art, there is a topological structure which represents a way of devices such as a server and a switch in a network being coupled. In a case where each of a plurality of transmission sources is capable of communicating with any of a plurality of transmission destinations via a topological structure, this topological structure may be referred to as a topological structure which allows all-to-all communication. Further, there is a topological structure in which all-to-all communication is performed without link congestion.

As the related art, for example, there is a technique in which a plurality of nodes in a network is divided into phases desired for all-to-all communication between a plurality of nodes which are included in first and second partial groups, and parallel processing is performed in accordance with a plurality of threads, by overlapping the phases. Regarding a program or a task, connection may be performed by an interconnection network using a hierarchical network and topology in which a hierarchical level In of N>1 is provided where n is 1 to N.

Japanese Laid-open Patent Publication No. 2013-037723 and Japanese Laid-open Patent Publication No. 2014-164756 are examples of the related art.

SUMMARY

According to an aspect of the invention, an apparatus stores first information and second information related to all-to-all communication in a network in which a first type of topological structures whose number is a second number and a second type of topological structures whose number is a first number are coupled to each other, where each of the first type of topological structures includes the first number of output ports and the first number of input ports that are respectively coupled to a plurality of transmission sources, and each of the second type of topological structures includes the second number of output ports that are respectively coupled to a plurality of transmission destinations and the second number of input ports. The first information includes a sequence of first picking numbers and a sequence of first identifier (ID)-sets that correspond to the sequence of first picking numbers, respectively, where each of the sequence of first picking numbers is equal to or smaller than the first number and indicates a number of first input ports allowing the all-to-all communication without link congestion in each of the first type of topological structures, and each of the sequence of first ID-sets includes input-port identifiers whose number is equal to corresponding one of the sequence of first picking numbers and which identify the first input ports. The second information includes a sequence of second picking numbers and a sequence of second ID-sets that correspond to the sequence of second picking numbers, respectively, where each of the sequence of second picking numbers is equal to or smaller than the second number and indicates a number of second output ports allowing the all-to-all communication without link congestion in each of the second type of topological structures, and each of the sequence of second ID-sets includes output-port identifiers whose number is equal to corresponding one of the sequence of second picking numbers and which identify the second output ports. In a case where the all-to-all communication is performed via the network without link congestion between a target number of transmission sources and the target number of transmission destinations where the target number is smaller than a product of the first number and the second number, the apparatus determines a first target picking number from the sequence of first picking numbers, and a second target picking number from the sequence of second picking numbers, with reference to the memory, so that a product of the first target picking number and the second target picking number is equal to or greater than the target number, and determines picking target transmission sources and picking target transmission destinations between which the all-to-all communication is to be performed without link congestion, from the plurality of transmission sources and the plurality of transmission destinations, based on the first ID-set of input-port identifiers corresponding to the determined first target picking number and the second ID-set of output-port identifiers corresponding to the determined second target picking number.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of stored contents of a switch for performing All-to-All communication, according to an embodiment;

DESCRIPTION OF EMBODIMENT

According to the related art, it is difficult to perform all-to-all communication without link congestion by using a portion of a network formed by combining a plurality of topological structures. Specifically, in a case where parallel distributed processing is performed by using some of a plurality of transmission sources and some of a plurality of transmission destinations, if communication is performed simply between any transmission source and any transmission destination, link congestion may occur even though all-to-all communication is performed. In this case, it takes time to perform all-to-all communication because of the link congestion.

It is preferable to perform all-to-all communication without link congestion by using a portion of a network formed by combining a plurality of topological structures.

Hereinafter, an embodiment of an information processing apparatus, an information processing method, and a program in this disclosure will be described in detail with reference to the drawings.

Figure 1:
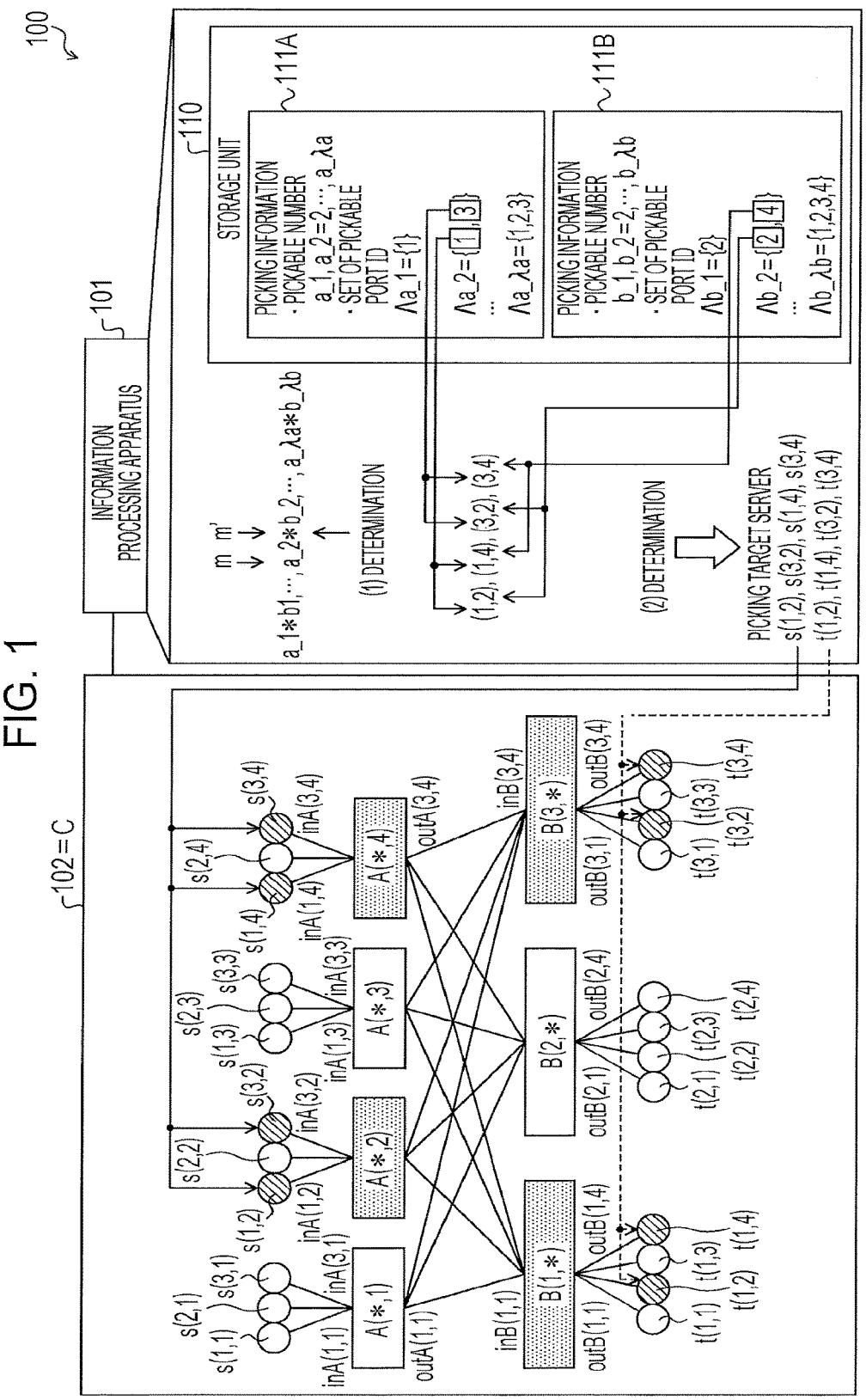
FIG. 1 is a diagram illustrating an example of an operation of an information processing apparatus, according to an embodiment.

FIG. 1 is a diagram illustrating an operation example of an information processing apparatus 101 according to the embodiment. The information processing apparatus 101 is a computer configured to perform control to perform all-to-all communication without link congestion by using a portion of a network. The network is formed by combining a plurality of topological structures. More specifically, the information processing apparatus 101 performs control to perform all-to-all communication between some of a plurality of transmission sources and some of a plurality of transmission destinations which are included in the network, without link congestion. For example, the information processing apparatus 101 is a management server configured to manage the network.

The topological structure represents a way of devices such as a server and a switch being coupled to each other. In a case where each of a plurality of transmission sources is capable of communicating with any of a plurality of transmission destinations via a topological structure, the topological structure may be referred to as a topological structure which allows all-to-all communication. The all-to-all communication is described below as "All-to-All communication". Further, there is a topological structure in which All-to-All communication is performed without link congestion. For example, Fat-Tree, multilayer full-mesh, and latin square Fat-Tree mean topological structures in which All-to-All communication is performed without link congestion. An example of latin square Fat-Tree will be described with reference to FIG. 2. Latin square Fat-Tree is described in Reference Document 1.

(Reference Document 1: M. Valerio and two others, "Using Fat-Trees to Maximize the Number of Processors in a Massively Parallel Computer", IEEE Computer Society, 1993)

In two-level Fat-Tree or latin square Fat-Tree, All-to-All communication from input servers to output servers without link congestion is possible. This is referred to as that unidirectional All-to-All communication without link congestion is possible. In addition, All-to-All communication from output servers to input servers is possible by following the reverse path. However, All-to-All communication between the input servers or between the output servers may be not possible. It is assumed that the number of input ports are equal to the number of output ports in the topological structure according to the embodiment.

For example, in high performance computing (HPC), when parallel distributed processing of fast Fourier transform (FFT) is performed, a topological structure in which All-to-All communication without link congestion is performed is used for efficient communication of data at low cost.

Here, in a case where it is desired that more servers are coupled while All-to-All communication without link congestion is held without an increase of the number of switch ports, it is considered that a network is formed by combining a plurality of topological structures. However, when a network is formed by combining a plurality of topological structures, it is difficult to perform All-to-All communication without link congestion in the formed network. For example, the followings are considered. Since one topological structure is considered as one switch, the number of components in the network is decreased, and communication procedures for performing all-to-all communication without link congestion are easily examined. However, if one switch and one topological structure which have the same number of ports are compared to each other, with a combination of an input port and an output port, All-to-All communication without congestion is possible by the switch, but link congestion may occur in the topological structure. Accordingly, in a situation in which a communication method of performing All-to-All communication without link congestion is examined, considering one topological structure as one switch is not possible.

An example in which, with a combination of an input port and an output port, All-to-All communication without congestion is possible by the switch, but link congestion occurs in the topological structure will be described. For example, it is assumed that a certain topological structure includes switches 1 to 4 and each of the switches 1 to 4 includes 4 ports. It is assumed that the switch 1 is coupled to the switches 3 and 4 and the switch 2 is coupled to the switches 3 and 4. It is assumed that the switch 1 is not coupled to the switch 2 and the switch 3 is not coupled to the switch 4. In this case, each of the switches 1 to 4 has 2 vacant ports which are not coupled. Thus, the topological structure may be considered as a virtual switch which includes 8 ports.

Here, in a case of the switch which includes 8 ports, even if any combination of an input port and an output port is provided, link congestion does not occur. However, in the above-described topological structure, if a communication is performed from one of 2 vacant ports in the switch 1 to one of 2 vacant ports in the switch 3 simultaneously with a communication from the other of the 2 vacant ports in the switch 1 to the other of the 2 vacant ports in the switch 3, link congestion occurs.

Further, in a case where a network is constructed by combining topological structures in which All-to-All communication without link congestion is performed, it is considered that All-to-All communication is performed by using some of a plurality of transmission sources and some of a plurality of transmission destinations which are included in the constructed network. For example, when parallel distributed processing is performed, all of the plurality of transmission sources and the plurality of transmission destinations are not used, but some transmission sources and some transmission destinations are sufficient for performing the parallel distributed processing. In the following descriptions, selecting only some transmission sources for use, from the plurality of transmission sources, is expressed by "picking". This is also similarly applied to a case of transmission destinations. For example, All-to-All communication in which latin square Fat-Tree is partially picked is disclosed in Reference Document 2.

(Reference Document 2: "Acceleration of All-to-all Communication in Latin Square Fat-Tree, Low Cost Scalable Network Topology" Toshihiro Shimizu and one other, Transaction of Information Processing Society of Japan, Vol. 5, October 2012).

However, if a transmission source or a transmission destination is picked from a network constructed by combining topological structures in which All-to-All communication without link congestion is performed, it is difficult to perform All-to-All communication without link congestion. For example, simply, if any transmission source and any transmission destination are picked, link congestion may occur even though All-to-All communication is performed. In this case, it takes time to perform All-to-All communication because of the link congestion.

Thus, in the information processing apparatus 101 in the embodiment, m' pieces which allow All-to-All communication is desired. m' is equal to or greater than m where m is the number of pieces desired to be picked from the number of ports which allow All-to-All communication in a portion of the topological structure in the constructed network. The information processing apparatus 101 determines picking target servers from port IDs corresponding to the m' pieces.

An operation example of the information processing apparatus 101 will be described with reference to FIG. 1. The information processing system 100 illustrated in FIG. 1 includes an information processing apparatus 101 and a network 102. The network 102 is a network formed by combining a first type of topological structure A and a second type of topological structure B. Here, the network 102 may also be considered as a topological structure. In the following descriptions, descriptions will be made by using the network 102 as a "topological structure C". The information processing apparatus 101 may be one server in the topological structure C or may be a server on the outside of the topological structure C. The topological structure C is a two-stage topological structure in which a second number of topological structures A are respectively coupled to a first number of topological structures B. The first number and the second number may be the same as each other or be different from each other. The topological structures A and B are topological structures in which All-to-All communication without link congestion is performed. The topological structures A and B may have the same type or may have different types from each other.

Here, the topological structure A includes a first number of input ports and the first number of output ports, that is, the number of the input ports and the number of the output ports are the same as the first number. The topological structure C includes topological structures A whose number is the same as the second number. Further, an input server s is coupled to each of input ports in the topological structures A whose number is the same as the second number. Thus, the number of input servers s is the same as a number obtained by multiplying the second number by the first number.

The topological structure B includes a second number of input ports and the second number of output ports, that is, the number of the input ports and the number of the output ports are the same as the second number. The topological structure C includes topological structures B whose number is the same as the first number. Further, an output server t is coupled to each of output ports in the topological structures B whose number is the same as the first number. Thus, the number of output servers t is the same as a number obtained by multiplying the second number by the first number. The number of the input servers s is the same as the number of the output servers t.

The topological structure A includes a sequence of first picking numbers $a\_1, a\_2, \ldots,$ and $a\_\lambda a$ which are each equal to or smaller than the first number, where each first picking number indicates the number of pickable ports which allow All-to-All communication without link congestion. Further, for the respective first picking numbers in the sequence of first picking numbers $a\_1, a\_2, a\_3, \ldots,$ and $a\_\lambda a$, the topological structure A includes a first ID-set of $\Lambda a\_1$ corresponding to $a\_1$, a first ID-set of $\Lambda a\_2$ corresponding to $a\_2, \ldots,$ and a first ID-set of $\Lambda a\_\lambda a$ corresponding to $a\_\lambda a$, as pieces of identification information (ID: IDentifier) of input ports whose number is the same as each first picking number. $\Lambda a\_1$ includes input port IDs whose number is equal to $a\_1$, $\Lambda a\_2$ includes input port IDs whose number is equal to $a\_2, \ldots$ and $\Lambda a\_\lambda a$ includes input port IDs whose number is equal to $a\_\lambda a$. As described above, $\Lambda a\_1$, $\Lambda a\_2$, and $\Lambda a\_\lambda a$ are each a first ID-set of IDs of pickable ports. The information processing apparatus 101 stores, in the storage unit 110, picking information 111A that includes a sequence of first picking numbers: $a\_1, a\_2, \ldots,$ and $a\_\lambda a$, and a sequence of first ID-sets: $\Lambda a\_1, \Lambda a\_2, \ldots,$ and $\Lambda a\_\lambda a$.

Similarly, the topological structure B includes a sequence of second picking numbers $b\_1, b\_2, \ldots,$ and $b\_\lambda b$ which are each equal to or smaller than the second number, where each second picking number indicates the number of pickable ports which allow All-to-All communication without link congestion. Further, for the respective second picking numbers in the sequence of second picking numbers: $b\_1, b\_2, \ldots,$ and $b\_\lambda b$, the topological structure B includes a second ID-set of $\Lambda b\_1$ corresponding to $b\_1$, a second ID-set of $\Lambda b\_2$ corresponding to $b\_2, \ldots,$ and a second ID-set of $\Lambda b\_\lambda b$ corresponding to $b\_\lambda b$, as pieces of identification information of output ports whose number is the same as each second picking number. $\Lambda b\_1$ includes output port IDs whose number is equal to $b\_1$, $\Lambda b\_2$ includes output port IDs whose number is equal to $b\_2, \ldots,$ and $\Lambda b\_\lambda b$ includes output port IDs whose number is equal to $b\_\lambda b$. The information processing apparatus 101 stores, in the storage unit 110, picking information 111B that includes a sequence of second picking numbers: $b\_1, b\_2, \ldots,$ and $b\_\lambda b$, and a sequence of second ID-sets: $\Lambda b\_1, \Lambda b\_2, \ldots,$ and $\Lambda b\_\lambda b$.

Here, the pieces of identification information of input ports for each first picking number may indicate a one-to-one correspondence or a one-to-many correspondence. In other words, one combination of output ports whose number is equal to each first picking number may be provided for each first picking number, or a plurality of combinations whose number is equal to each first picking number may be provided for each first picking number. The above descriptions are also similarly applied to each second picking number.

FIG. 1 illustrates an example of a case where the first number is 3 and the second number is 4. The topological structure C illustrated in FIG. 1 includes topological structures A(*, 1), A(*, 2), A(*, 3), and A(*, 4), and topological structures B(1, *), B(2, *), and B(3, *). A part for a character string in parentheses among signs assigned to topological structures or objects relating to the topological structure is referred to as an in-parenthesized sign below. For example, the in-parenthesized sign of the topological structure A(*, 1) is "*,1". Input ports inB(1, 1) to inB(3, 4) of topological structures B(1, *) to B(3, *) are respectively coupled to output ports outA(1, 1) to outA(3, 4) of topological structures A(*, 1) to A(*, 4). Specifically, ports outA(1, 1) to outA(3, 4) are respectively coupled to the ports inB having the same in-parenthesized signs as those of the ports outA(1, 1) to outA(3, 4).

Input servers s(1, 1) to s(3, 4) as a plurality of transmission sources are coupled to the input ports inA(1, 1) to inA(3, 4) of the topological structures A(*, 1) to A(*, 4), respectively. Similarly, output servers t(1, 1) to t(3, 4) as a plurality of transmission destinations are coupled to the output ports outB(1, 1) to outB(3, 4) of the topological structures B(1, *) to B(3, *), respectively. For convenient display, FIG. 1 illustrates some of inA(1, 1) to inA(3, 4), outA(1, 1) to outA(3, 4), inB(1, 1) to inB(3, 4), and outB(1, 1) to outB(3, 4).

Here, the first component of an in-parenthesized sign of each of the input ports inA or each of the output ports outA of the topological structures A(*, 1) to A(*, 4) is considered as a value for identifying the corresponding port in the topological structure to which the port belongs, and the second component thereof is considered as an ID of the topological structure. Thus, the first component of the in-parenthesized sign of each of the input ports inA or each of the output ports outA may be provided in $\Lambda a\_1, \Lambda a\_2, \ldots,$ and $\Lambda a\_\lambda a$. FIG. 1 illustrates an example of $\Lambda a\_1 = \{1\}, \Lambda a\_2 = \{1, 3\}, \ldots,$ and $\Lambda a\_\lambda a = \{1, 2, 3\}$. $\Lambda a\_1 = \{1\}$ represents that All-to-All communication without link congestion is performed by using input ports and output ports having the first component of 1 of the topological structure A. $\Lambda a\_2 = \{1, 3\}$ represents that All-to-All communication without link congestion is performed by using input ports and output ports having the first component of 1 and input ports and output ports having the first component of 3 of the topological structure A.

The first component of an in-parenthesized sign of each of the input ports inB or each of the output ports outB of the topological structures B(1, *) to B(3, *) is considered as an ID of the topological structure to which the corresponding port belongs, and the second component thereof is considered as a value for identifying the port in the topological structure. Thus, the second component of the in-parenthesized sign of each of the input ports inB or each of the output ports outB may be provided in $\Lambda b\_1, \Lambda b\_2, \ldots,$ and $\Lambda b\_\lambda b$.

As described above, a value for identifying the corresponding port within the topological structure, among values in an in-parenthesized sign for identifying the port, may be provided in $\Lambda a\_1, \Lambda a\_2, \ldots,$ and $\Lambda a\_\lambda a$ and $\Lambda b\_1, \Lambda b\_2, \ldots,$ and $\Lambda b\_\lambda b$ which are sequences of sets of IDs of pickable ports. Thus, since a set of IDs of pickable ports is configurable by including a component of an ID of a port, the component is referred to as a port ID component.

In the embodiment, it is assumed that, when All-to-All communication without link congestion is performed in the first type of topological structure, the communication is performed between input ports corresponding to a first picking number and output ports which have the same identification information as that of the input ports. For example, in a case of $\Lambda a\_2 = \{1, 3\}$, when All-to-All communication without link congestion is performed, inA(1, 1), inA(3, 1), outA(1, 1), and outA(3, 1) of the topological structure A(*, 1) are used. The above descriptions are also similarly applied to the second type of topological structure.

Here, it is assumed that a portion is picked from the topological structure C and parallel distributed processing is performed by an instruction of a user who uses the topological structure C. As the parallel distributed processing, the number of input servers to which a job is desired to be submitted is set to be m as any value. m is a value smaller than a product of the first number and the second number, because a portion of all the input servers for the topological structure C is picked.

Firstly, the information processing apparatus 101 determines a first picking number from a sequence of first picking numbers and a second picking number from a sequence of second picking numbers so that a product of the first picking number and the second picking number is equal to or greater than m. The determination is performed with reference to the pieces of picking information 111A and 111B.

In the example of FIG. 1, m is set at 3. As illustrated with (1) in FIG. 1, the information processing apparatus 101 determines a first picking number from a sequence of first picking numbers, to satisfy a_2=2, and determines a second picking number from a sequence of second picking numbers, to satisfy b_2=2, where a product of the first picking number and the second picking number is 4 greater than m=3.

Then, the information processing apparatus 101 specifies, as a ID-set, a set of IDs of input ports whose number is the same as the first picking number, and specifies, as a ID-set, IDs of output ports whose number is the same as the second picking number, where the input ports correspond to the determined first picking number and the output ports correspond to the determined second picking number. In the example of FIG. 1, the information processing apparatus 101 specifies $\Lambda a\_2$ corresponding to a_2 which is a first picking number, and specifies $\Lambda b\_2$ corresponding to b_2 which is a second picking number.

The information processing apparatus 101 determines picking target transmission sources and picking target transmission destinations for performing All-to-All communication without link congestion, from a plurality of transmission sources and a plurality of transmission destinations, based on the determined first picking number of input port IDs and the determined second picking number of output port IDs. In the example of FIG. 1, specifically, the information processing apparatus 101 creates four sequences of IDs: (1, 2), (1, 4), (3, 2), and (3, 4), by extracting port ID components from $\Lambda a\_2$ and $\Lambda b\_2$.

The information processing apparatus 101 determines an input server having the same sequence of IDs as that of the created sequence of IDs, to be a picking target transmission source, and determines an output server having the same sequence of IDs as that of the created sequence of IDs, to be a picking target transmission destination. The input server determined as the picking target transmission source and the output server determined as the picking target transmission destination are collectively referred to as picking target servers. In the example illustrated in FIG. 1, the information processing apparatus 101 determines input servers s(1, 2), s(3, 2), s(1, 4), and s(3, 4) and output servers t(1, 2), t(1, 4), t(3, 2), and t(3, 4), as picking target servers.

The picking target servers determined by the above-described processing are capable of performing All-to-All communication without link congestion. Here, in order to All-to-All communication without link congestion, a transfer pattern of the picking target servers is determined, and output ports corresponding to a combination of transmission sources and transmission destinations within each of the topological structures in the topological structure C is specified. The transfer pattern of the picking target servers will be described with reference to FIG. 10, and an example of specifying output ports will be described with reference to FIG. 11.

FIG. 1 illustrates a state after the topological structure C has been constructed. However, the information processing apparatus 101 may create connection information regarding a connection relationship between the topological structures in the topological structure C. The manager of the topological structure may construct the topological structure C by browsing the created connection information. For example, the manager of the topological structure C grasps an input port of the topological structure B, to which the output port of the topological structure A may be linked, from the created connection information. A creation example of the connection information will be described with reference to FIGS. 7, 12, and 17. An apparatus that determines the picking target servers (described with reference to FIG. 1) may be separate from an apparatus that creates the connection information. In this case, the apparatus that creates the connection information may be a personal computer (PC), for example. Next, an example of latin square Fat-Tree will be described with reference to FIG. 2.

Figure 2:
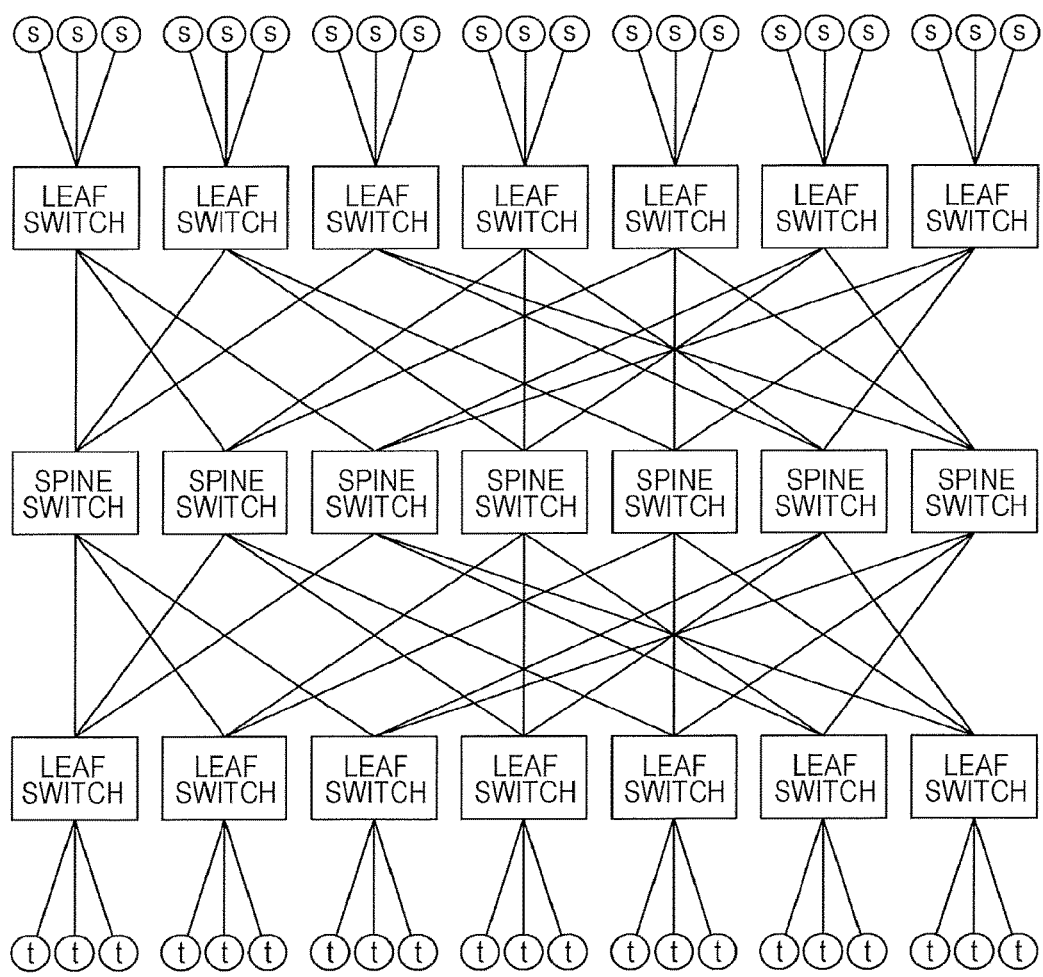
FIG. 2 is a diagram illustrating an example of latin square Fat-Tree, according to an embodiment.

FIG. 2 is a diagram illustrating an example of latin square Fat-Tree. FIG. 2 illustrates an example of connection in latin square Fat-Tree, as an example of a topological structure in which All-to-All communication without congestion is performed. In FIG. 2, a circle indicates a server and a square indicates a switch. A server for a circle having "s" provided therein indicates an input server. A server for a circle having "t" provided therein indicates an output server. As a switch, a Leaf switch configured to couple between another switch and a server and a Spine switch configured to couple between switches are provided. The input server s and the output server t perform communication with each other via the Leaf switch and the Spine switch. The number of switches through which the input server and the output server pass is defined to be "the number of hops".

In latin square Fat-Tree illustrated in FIG. 2, the input server s and the output server t are able to perform communication with each other via three hops, and more servers than those in two-level Fat-Tree may be coupled.

The Leaf switch in latin square Fat-Tree illustrated in FIG. 2 is coupled with any three Spine switches among seven Spine switches. When the Leaf switches are coupled to all Spine switches, this topological structure becomes Fat-Tree.

FIG. 3 is a diagram illustrating an example of stored contents of switches for performing All-to-All communication. FIG. 3 illustrates an example in which input servers s0 to s8 are coupled to and output servers t0 to t8 via three of Leaf switches 1 to 6 and Spine switches 1 to 3. FIG. 3 illustrates an example of stored contents for the Leaf switch 1.

Each of the switches stores information of specifying output ports which correspond to a combination of transmission sources and transmission destinations. The Leaf switch 1 includes ports p0 to p5. In the example in FIG. 3, an output port table 301 is illustrated as the information of the Leaf switch 1. The output port table 301 is set for performing All-to-All communication without congestion. Fields of the output port table 301 in a vertical direction respectively indicate transmission source servers, and fields thereof in a horizontal direction respectively indicate transmission destination servers. Cells indicated by "-" in the output port table 301 indicate that any number may set as a port number since transmission data does not pass through the switch.

FIG. 3 illustrates an example in which the input server s0 communicates with the output server t3, the input server s1 communicates with the output server t4, and the input server s2 communicates with the output server t5. In a case where the Leaf switch 1 receives a communication from the input server s0 to the output server t3, the Leaf switch 1 specifies the port p0 with reference to the output port table 301, because the transmission source is the input server s0 and the transmission destination is the output server t3. The Leaf switch 1 relays the communication of the input server s0 by using the specified port p0.

In a case where the Leaf switch 1 receives a communication from the input server s1 to the output server t4, the Leaf switch 1 specifies the port p1 with reference to the output port table 301, because the transmission source is the input server s1 and the transmission destination is the output server t4. In a case where the Leaf switch 1 receives a communication from the input server s2 to the output server t5, the Leaf switch 1 specifies the port p2 with reference to the output port table 301, because the transmission source is the input server s2 and the transmission destination is the output server t5. Similar to the Leaf switch 1, the Spine switches 1 to 3 which are respectively coupled to the ports p0 to p2 of the Leaf switch 1 specify output ports corresponding to the combination of the transmission sources and the transmission destinations, with reference to an output port table of the corresponding Spine switch.

With the above descriptions, a communication path from the input server s0 to the output server t3 is represented by a bold solid line illustrated in FIG. 3. Similarly, a communication path from the input server s1 to the output server t4 is represented by a bold dot line illustrated in FIG. 3. A communication path from the input server s2 to the output server t5 is represented by a bold broken line illustrated in FIG. 3. In this manner, as illustrated in FIG. 3, it is understood that each of the communication paths has no congestion.

Hardware Configuration Example of Information Processing Apparatus 101

Figure 4:
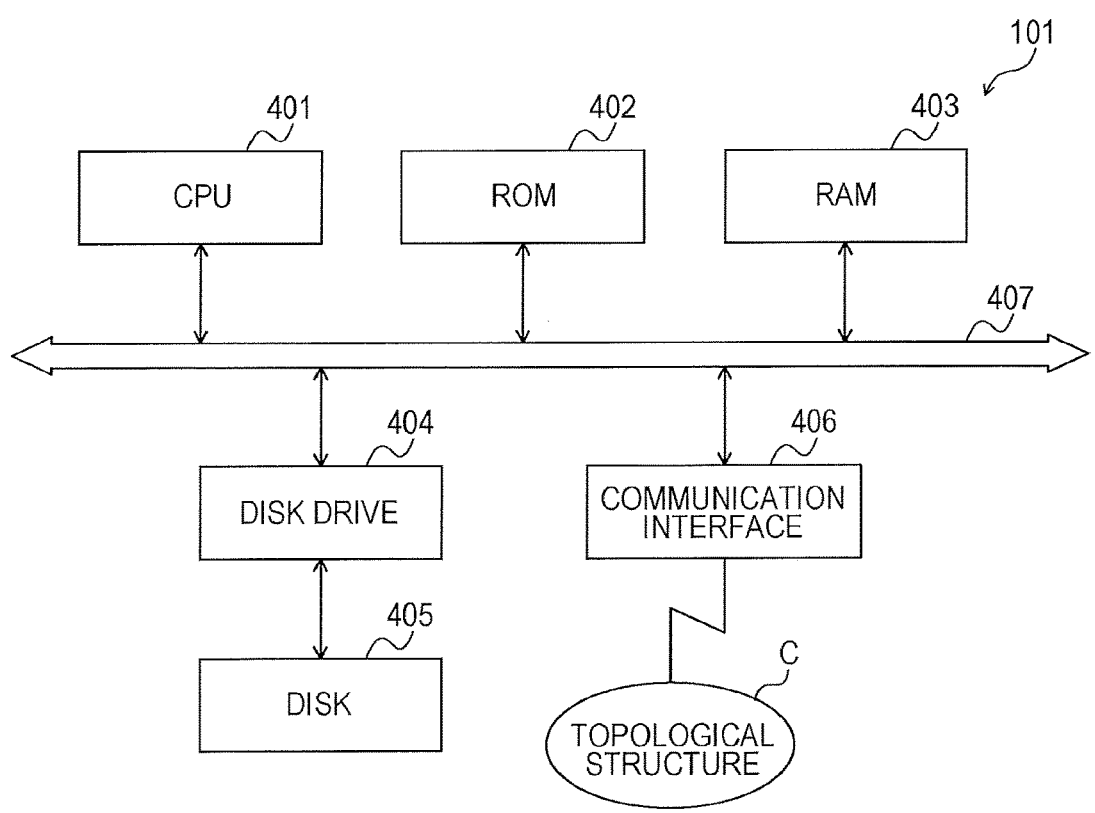
FIG. 4 is a diagram illustrating an example of a hardware configuration of an information processing apparatus, according to an embodiment.

FIG. 4 is a diagram illustrating a hardware configuration example of the information processing apparatus 101. In FIG. 4, the information processing apparatus 101 includes a central processing unit (CPU) 401, a read-only memory (ROM) 402, and a random access memory (RAM) 403. The information processing apparatus 101 further includes a disk drive 404, a disk 405, and a communication interface 406. The CPU 401 to the disk drive 404 and the communication interface 406 are coupled to each other via a bus 407.

The CPU 401 is an execution processing unit that controls the entirety of the information processing apparatus 101. The ROM 402 is a nonvolatile memory that stores a program such as a boot program. The RAM 403 is a volatile memory used as a work area of the CPU 401.

The disk drive 404 is a control device that controls data to be read and written from and in the disk 405, in accordance with control of the CPU 401. As the disk drive 404, for example, a magnetic disk drive, an optical disk drive, a solid state drive, and the like may be employed. The disk 405 is a nonvolatile memory that stores data which has been written by the control of the disk drive 404. For example, in a case where the disk drive 404 is a magnetic disk drive, a magnetic disk may be employed as the disk 405. In a case where the disk drive 404 is an optical disk drive, an optical disk may be employed as the disk 405. In a case where the disk drive 404 is a solid state drive, a semiconductor memory formed by a semiconductor element, that is, a so-called semiconductor disk may be employed as the disk 405.

The communication interface 406 is a control device that functions as an interface between the topological structure C and the components of the information processing apparatus 101, and controls an input and an output of data from and to another device. Specifically, the communication interface 406 is coupled to another device on a communication line via the topological structure C. As the communication interface 406, for example, a modem, a local area network (LAN) adapter, and the like may be employed.

In a case where the manager of the information processing apparatus 101 directly operates the information processing apparatus 101, the information processing apparatus 101 may have hardware of a display, a keyboard, and a mouse.

In a case where the information processing apparatus 101 creates connection information regarding a connection relationship between the topological structures in the topological structure C, the information processing apparatus 101 receives an operation of a user. Thus, the information processing apparatus 101 includes a keyboard, a mouse, and a display. The information processing apparatus 101 may further include a printer for outputting the created connection information.

Functional Configuration Example of Information Processing Apparatus 101

Figure 5:
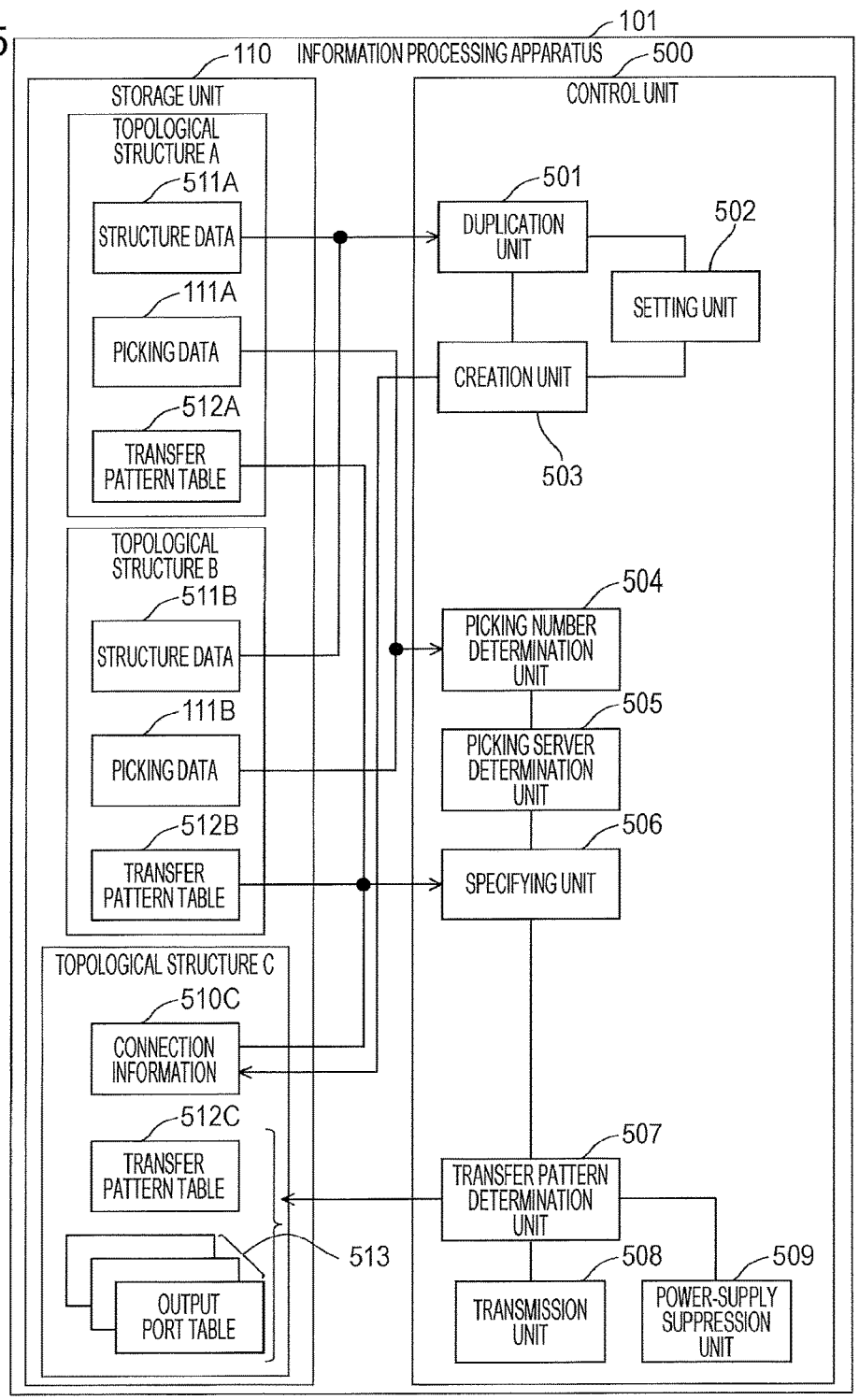
FIG. 5 is a diagram illustrating an example of a functional configuration of an information processing apparatus, according to an embodiment.

FIG. 5 is a diagram illustrating a functional configuration example of the information processing apparatus 101. The information processing apparatus 101 includes a control unit 500 and a storage unit 110. The control unit 500 includes a duplication unit 501, a setting unit 502, a creation unit 503, a picking number determination unit 504, a picking server determination unit 505, a specifying unit 506, a transfer pattern determination unit 507, a transmission unit 508, and a power-supply constraint unit 509. In the control unit 500, functions of the units are realized by causing the CPU 401 to execute a program stored in a storage device. Specifically, for example, the ROM 402, the RAM 403, the disk 405, and the like illustrated in FIG. 4 are provided as the storage device. Processing results of the units are stored in the RAM 403, a register of the CPU 401, a cache memory of the CPU 401, and the like.

FIG. 5 illustrates creation of new connection information 510C of the topological structure C and determination of communication procedures of determining a picking target server from the topological structure C and performing All-to-All communication without link congestion by using the determined picking target server.

Further, in the embodiment, descriptions regarding the topological structure C which is formed from the two-stage topological structure and descriptions regarding a topological structure C which is formed from an n-stage topological structure will be made with reference to FIG. 5. Descriptions regarding the topological structure C allowing bidirectional All-to-All communication without link congestion will be made. The topological structure C formed from the two-stage topological structure will be described in detail with reference to FIGS. 7 to 11. The topological structure C formed from the n-stage topological structure will be described in detail with reference to FIGS. 12 and 13. Descriptions regarding the topological structure C allowing bidirectional All-to-All communication without link congestion will be made with reference to FIGS. 17 and 18.

The information processing apparatus 101 may access the storage unit 110. The storage unit 110 is accommodated in the storage device such as the RAM 403 and the disk 405. Providing the storage unit 110 with structure data 511A indicating the topological structure A and structure data 511B indicating the topological structure B is sufficient to create the connection information 510C of the topological structure C formed from the two-stage topological structure. Here, providing at least the number of input ports and the number of output ports is sufficient for the topological structure 511A, and providing at least the number of input ports and the number of output ports is sufficient for the structure data 511B. The above descriptions are also similarly applied to the topological structure C formed from the n-stage topological structure. For example, providing structure data 511A1 indicating a topological structure A1, structure data 511A2 indicating a topological structure A2, . . . , and structure data 511An indicating a topological structure An is sufficient for the storage unit 110, where n is any integer of 2 or more.

Firstly, descriptions of creation of the connection information 510C of the topological structure C will be made. Regarding the topological structure C formed from the two-stage topological structure, when the duplication unit 501 receives a request for creating the connection information 510C, the duplication unit 501 duplicates the structure data 511A the second number of times, and duplicates the structure data 511B the first number of times.

Here, in the case of creating the connection information 510C that couple pieces of the structure data 511A and pieces of the structure data 511B which have been duplicated, a first method and a second method may be provided as a method for the coupling.

As the first method, the creation unit 503 creates connection information 510C indicating a connection relationship for coupling each of the first number of output ports of each of the second number of duplicated pieces of structure data 511A, to one of the second number of input ports of each of the first number of duplicated pieces of structure data 511B.

As the second method, the setting unit 502 sets an ID of each of the first number of output ports of each of the second number of duplicated pieces of structure data 511A, at information in which a first value for identifying an output port within the structure data 511A and a second value based on the second number are combined in this order. Further, the setting unit 502 sets an ID of each of the second number of input ports inB of each of the first number of duplicated pieces of structure data 511B, at information in which a first value based on the second number and a second value for identifying an input port within the structure data 511B are combined in this order.

For example, processing of the setting unit 502 will be described with reference to FIG. 1. Firstly, the duplication unit 501 duplicates three (as the second number) pieces of structure data A(*, 1), A(*, 2), and A(*, 3). The setting unit 502 sets, for example, an ID of each of output ports of the structure data A(*, 1), at information in which a first value for identifying an output port within the structure data A(*, 1) and any one of values 1 to 3, which is based on the second number, are combined in this order. The first value for identifying each of the output ports in the structure data A(*, 1) is any one of 1 to 3. The second value based on the second number is "1" which is the same as the second component of the structure data A(*, 1). As a result, the setting unit 502 sets IDs of output ports outA of the structure data A(*, 1) at outA(1, 1), outA(2, 1), and outA(3, 1).

The creation unit 503 creates connection information 510C regarding a connection relationship in which an output port and an input port which have the same ID are coupled to each other. Specifically, the connection information 510C indicates a connection between each of the first number of output ports of each of the second number of pieces of structure data 511A and an input port having the same ID as that of the corresponding output port, among input ports of the first number of pieces of structure data 511B.

Next, the topological structure C formed from the n-stage topological structure will be described. In a case where n is set at any natural number of 2 or more, the duplication unit 501 receives a request for creating connection information 510C that indicates a connection relationship between topological structures in the topological structure C which includes n types of topological structures. At this time, for i that is any natural number of 1 to n, the duplication unit 501 duplicates the i-th structure data indicating an i-th type of topological structure, a third number of times, where the third number is obtained by dividing a product of the first number to the n-th number by an i-th number.

Firstly, the setting unit 502 generates an i-th sequence of numbers which functions as an ID and which corresponds to an input port and an output port in the duplicated i-th structure data and functions as IDs. The generated i-th sequence of numbers is a sequence of numbers in which a value of identifying an input port or an output port in the i-th structure data is inserted at the i-th number position within a sequence of (n−1) numbers that is obtained by excluding the i-th number from a sequence of numbers from the first number to the n-th number. The setting unit 502 sets each of IDs of input ports and output ports in the duplicated i-th structure data, at the generated i-th sequence of numbers.

Here, processing of the setting unit 502 will be described. The setting unit 502 generates a sequence of (n−1) numbers for identifying each of the duplicated pieces of the i-th structure data, by excluding the i-th number from a sequence of numbers from the first number to the n-th number. For example, the setting unit 502 generates a sequence of (n−1) numbers, that is, (any natural number of 1 to the first number, . . . , any natural number of 1 to the (i−1)th number, any natural number of 1 to the (i+1)th number, . . . , and any natural number of 1 to the n-th number). The number of values that are taken on by this sequence is accurately equal to the number of the duplicated pieces of the i-th structure data. Accordingly, setting a different value taken by each of the generated sequences to each of the duplicated pieces of the i-th structure data allows each of the duplicated pieces of the i-th structure data to be identified. The setting unit 502 generates, as an i-th sequence of numbers, a sequence of numbers in which any value of 1 to the i-th number is inserted at the i-th number position in the generated sequence of (n−1) numbers as a value for identifying an input port or an output port in the i-th structure data. The setting unit 502 then sets the generated i-th sequence of numbers to each input port or each output port. In this way, different IDs are respectively set to all input ports of pieces of structure data from the first structure data to the n-th structure data which have been duplicated. The above descriptions are also similarly applied to a case of output ports.

The creation unit 503 creates connection information 510C indicating a connection relationship in which an output port and an input port which have the same ID are coupled to each other. Specifically, the connection information 510C indicates that each of the k-th number of output ports in the k-th structure data is coupled to an input port having the same ID as the corresponding output port among the (k+1)th number of input ports in the (k+1)th structure data, where k is a natural number of 1 to (n−1).

Next, the topological structure C which allows bidirectional All-to-All communication without link congestion will be described. Processing performed by the units of the duplication unit 501 to the creation unit 503 in this topological structure C is the same as that in the topological structure C formed from the n-stage topological structure. However, in this topological structure C, it is assumed that each topological structure in this topological structure C satisfies all three conditions as follows. The first condition is that the number of stages of the topological structure C is set to be any odd number of 3 or more. The second condition is that, when j is a natural number from 1 to ((n−1)/2), the j-th type of topological structure included in the topological structure C is a topological structure obtained by reversing the (n−j+1)th type of topological structure. Here, a topological structure is obtained by reversing another topological structure when the topological structure and the another topological structure are arranged with a straight line interposed between the topological structures, and the topological structure has a relationship of line symmetry with the another topological structure with respect to the straight line as an axis. For example, in a case of n=5, the first type of topological structure and the fifth type of topological structure have a relationship of being reversed to each other, and the second type of topological structure and the fourth type of topological structure have a relationship of being reversed to each other. The third condition is that the ((n+1)/2)th type of topological structure includes a plurality of switches each coupling switches and the topological structure has a structure of line symmetry with respect to a line of linking the plurality of switches respectively. For example, the plurality of switches are Spine switches illustrated in FIG. 2.

Next, descriptions of determining communication procedures of determining picking target servers from the topological structure C and performing All-to-All communication without link congestion by using the determined picking target servers in the topological structure C will be made. Providing the storage unit 110 with the connection information 510C, pieces of picking information 111A and 111B, and transfer pattern tables 512A and 512B is sufficient to perform All-to-All communication without link congestion by using the determined picking target servers.

In the transfer pattern table 512, transfer patterns whose number is equal to each of a sequence of picking numbers are stored in association with the each picking number, where a transfer pattern represents a combination of input ports and output ports via which All-to-All communication is performed without link congestion in a certain topological structure. For example, if the example in FIG. 1 is used, the transfer pattern table 512A stores a_1 transfer patterns corresponding to a_1, a_2 transfer patterns corresponding to a_2, ..., and a_$\lambda$a transfer patterns corresponding to a_$\lambda$a.

Firstly, a topological structure C formed from a two-stage topological structure will be described. The picking number determination unit 504 determines a first picking number from a sequence of first picking numbers and a second picking number from a sequence of second picking numbers, with reference to the picking information 111A and 111B, so that a product of the first picking number and the second picking number is equal to or greater than m. It is preferable that m' indicating the product of the first picking number and the second picking number is equal to or greater than m and is most approximate to m. In the example in FIG. 1, the picking number determination unit 504 determines, as the first picking number, a_2=2 from a sequence of first picking numbers, and determines, as the second picking number, b_2=2 from a sequence of second picking numbers, so that a product of the first picking number and the second picking number is equal to or greater than m=3.

There may be a case where there are a plurality of combinations of a first picking number in a sequence of first picking numbers and a second picking number in a sequence of second picking numbers, for which a product of the first picking number and the second picking number has the same value. In the example in FIG. 1, it is assumed that m=3, and a_1=1, a_2=2, b_2=2, and b_3=4. In this case, as a value that is equal to or greater than m and is most approximate to m, a_2*b_2=2*2=4 and a_1*b_3=1*4=4 are obtained, and there exist a plurality of combinations of first picking numbers and second picking numbers for which a product of the first picking number and the second picking number has the same value.

In such a case, the picking number determination unit 504 may employ any one of the combinations. The picking number determination unit 504 may select a combination in which the first picking number is approximate to the second picking number. When a combination in which the first picking number is approximate to the second picking number is employed, the picking number determination unit 504 may pick out a topological structure with good balance.

As another method, the picking number determination unit 504 may employ a combination having the sum of the first picking number and the second picking number, which is smaller than the sums in other combinations. Thus, the picking number determination unit 504 may more reduce consumed power. For example, in a case of employing a combination of a_2=2 and b_2=2, the number of picked topological structures is four in total, as illustrated in FIG. 1, two topological structures A and two topological structures B. On the contrary, in a case of employing a combination of a_1=1 and b_3=4, the number of picked topological structures is five in total, four topological structures A and one topological structure B. In this manner, since the sum of the first picking number and the second picking number is equal to the number of topological structures to be picked, the picking number determination unit 504 is able to more reduce the consumed power by employing a combination whose sum of the first picking number and the second picking number is smaller than sums in other combinations.

The picking server determination unit 505 specifies input port IDs whose number is equal to the determined first picking umber, and specifies output port IDs whose number is equal to the determined second picking number, with reference to the pieces of picking information 111A and 111B. The picking server determination unit 505 determines picking target servers for performing All-to-All communication without link congestion, from among the plurality of transmission sources and the plurality of transmission destinations, based on the first picking number of input port IDs and the second picking number of output port IDs.

The specifying unit 506 specifies combinations of first transfer patterns whose number is equal to the determined first picking number, and second transfer patterns whose number is equal to the determined second picking number, with reference to the transfer pattern tables 512A and 512B. For example, in the example in FIG. 1, the specifying unit 506 specifies four combinations which are obtained by combining two first transfer patterns (corresponding to a_2=2) and two second transfer patterns (corresponding to b_2=2).

Figure 10:
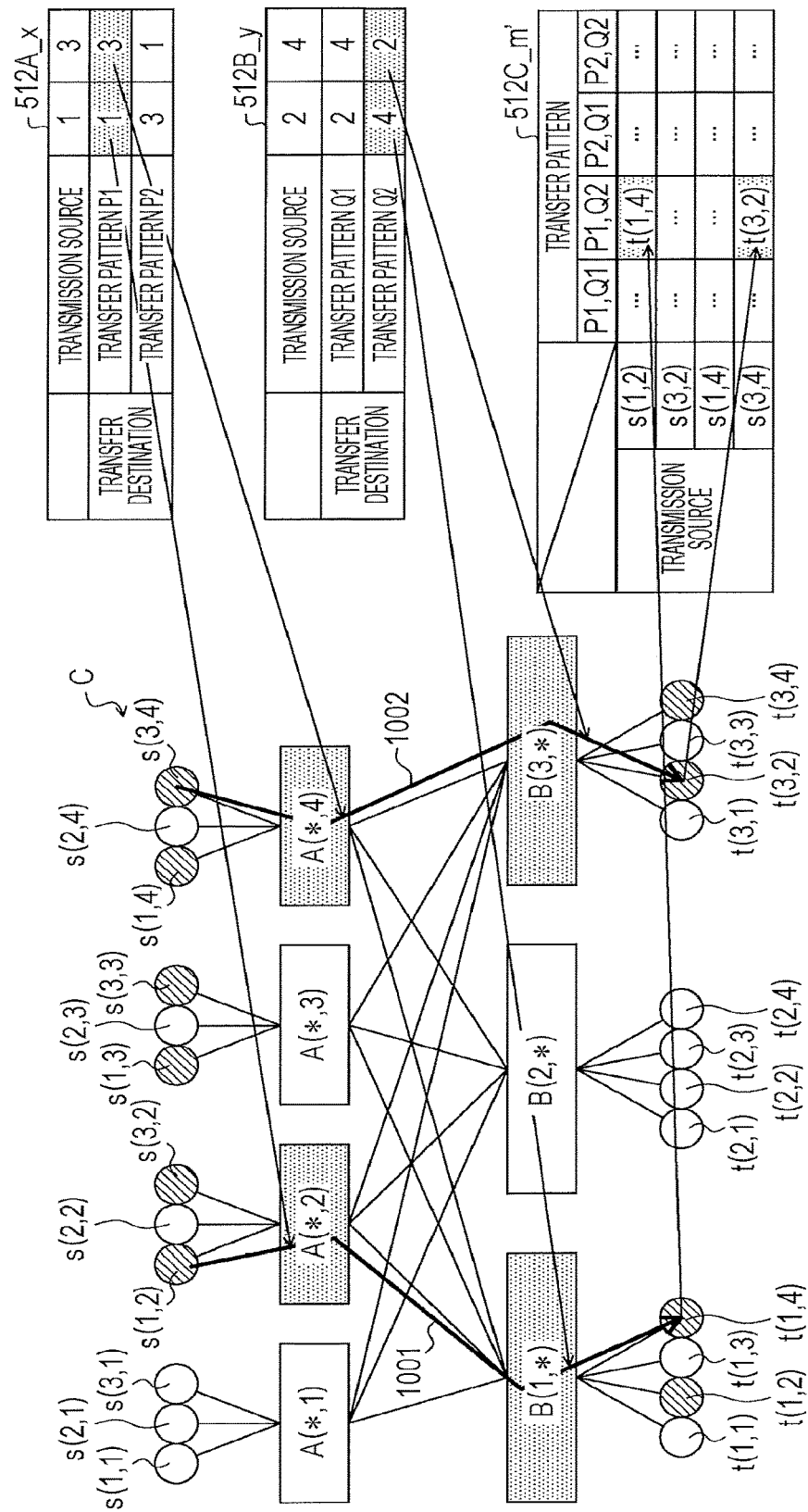
FIG. 10 is a diagram illustrating an example of a transfer pattern at a time of picking, according to an embodiment.

When transfer patterns in a combination are designated in the topological structure C represented by the connection information 510C, in association with the specified combinations, the specifying unit 506 specifies a path from each determined picking target transmission sources to the picking target transmission destination. FIG. 10 illustrates a specific method of specifying a path.

Figure 11:
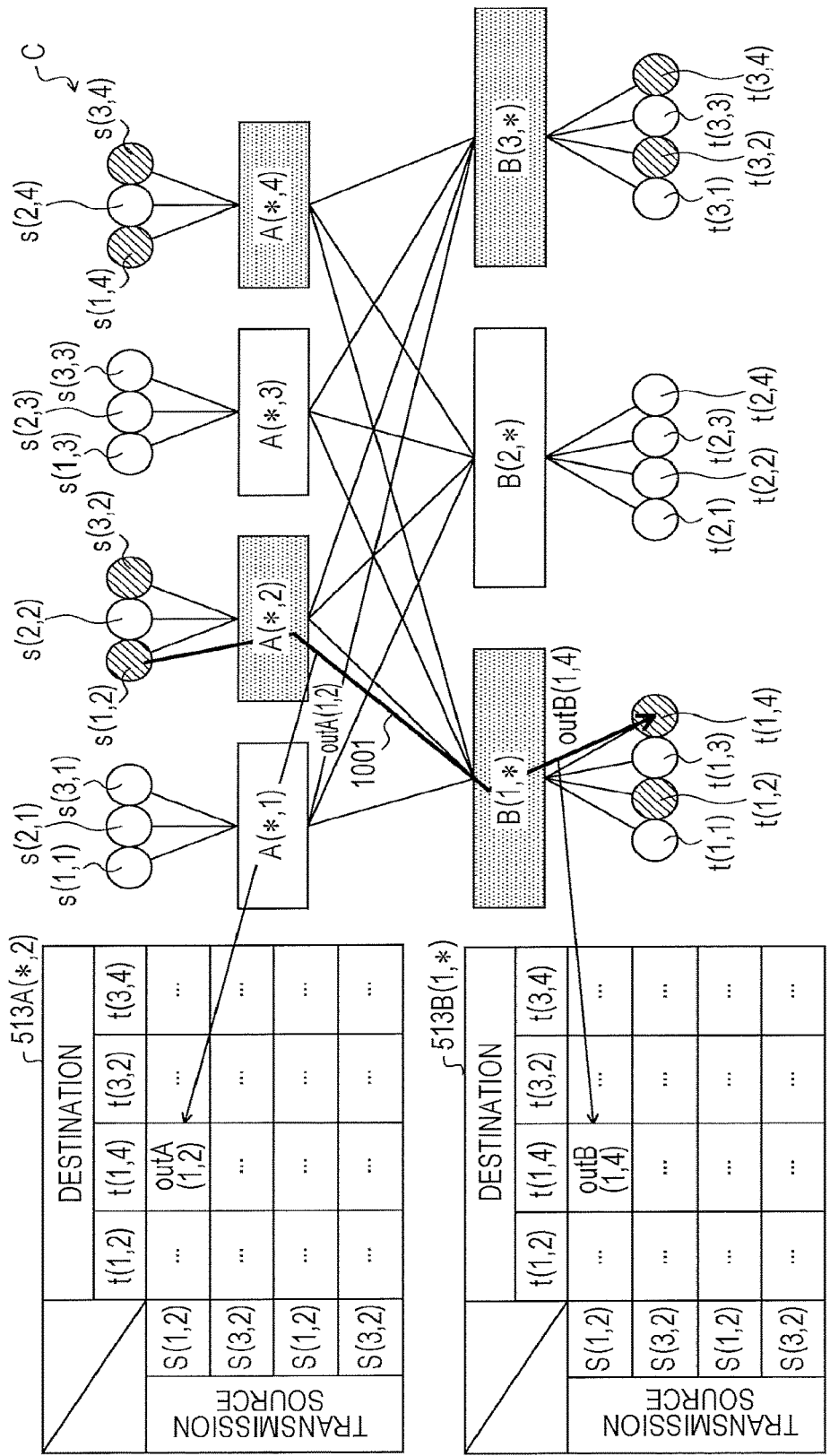
FIG. 11 is a diagram illustrating an example of an output port table at a time of picking, according to an embodiment.

The transfer pattern determination unit 507 determines, based on paths specified in association with the combinations, a transfer pattern for performing All-to-All communication from the picking target transmission sources to the respective picking target transmission destinations without link congestion in the topological structure C. Further, the transfer pattern determination unit 507 determines an output port corresponding to a combination of a picking target transmission source and a picking target transmission destination in each of the topological structures in the topological structure C. FIG. 10 illustrates a method of determining the transfer pattern. FIG. 11 illustrates a method of determining the output port. The transfer pattern determination unit 507 registers the determined transfer pattern in the transfer pattern table 512C and registers the determined output port in the output port table 513.

The transmission unit 508 transmits the transfer pattern table 512C for performing All-to-All communication without link congestion from the picking target transmission sources to the respective picking target transmission destinations in the topological structure C, to each of the plural picking target transmission sources. The transmission unit 508 transmits an output port table 513 to each of switches included in each of the topological structures corresponding to the output port table 513. Here, the output port table 513 includes information regarding an output port which corresponds to a combination of a picking target transmission source and a picking target transmission destination within each of topological structures on a path from the picking target transmission source to the picking target transmission destination.

The power-supply constraint unit 509 constrains a supply of power to at least one of servers other than the picking target servers and topological structures which are not provided on the paths from picking target transmission sources to the respective picking target transmission destinations. Here, the servers other than the picking target servers mean transmission sources other than the picking target transmission sources among a plurality of transmission sources and transmission destinations other than the picking target transmission destinations among a plurality of transmission destinations. The topological structures which are not provided on the paths from the picking target transmission sources to the respective picking target transmission destinations indicate topological structures which are not provided on the above-described paths among all topological structures in the topological structure C.

For example, if time to conduct a job is sufficiently long and it is possible to secure sufficient time to restart after the supply of power is suspended, the power-supply constraint unit 509 may block the supply of the power to a server other than the picking target servers or a topological structure which is not provided on the above-described paths. If the time to conduct a job is short and it is not possible to secure time to restart after the supply of the power is suspended, the power-supply constraint unit 509 may set a server other than the picking target servers or a topological structure which is not provided on the above-described paths, to be in a standby mode. Here, the standby mode means a state which is allowed to be immediately brought back to a normal state and a state in which the quantity of consumed power is smaller than that in the normal state.

Next, the topological structure C formed from the n-stage topological structure will be described. In this case, the information processing apparatus 101 determines picking target servers from a topological structure C including an n-stage topological structure (n is any natural number of 2 or more). The topological structure C includes n types of topological structures from the first type of topological structure, in which the first number of input ports and the first number of output ports are provided, to the n-th type of topological structure, in which the n-th number of input ports and the n-th number of output ports are provided. Further, in the topological structure, a plurality of transmission sources are respectively coupled to the input ports of the first type of topological structure, and a plurality of transmission destinations are respectively coupled to the output ports of the n-th type of topological structure.

Further, the picking information 111 stores a sequence of i-th picking numbers each indicating the number of pickable input ports which are used for performing All-to-All communication without link congestion in the i-th type of topological structure and whose number is equal to or smaller than the i-th number, where i is a natural number of 1 to n. The picking information 111 stores input port IDs which correspond to each i-th picking number in the sequence of i-th picking numbers and whose number is equal to the each i-th picking number.

Here, it is assumed that All-to-All communication between m transmission sources and m transmission destinations is performed via the topological structure C without link congestion, where m is a number smaller than a product of the first number to the n-th number. At this time, the picking number determination unit 504 determines an i-th target picking number from a sequence of i-th picking numbers, for each i from 1 to n, so that a product of the first target picking number to the n-th target picking number is equal to or greater than m, with reference to the picking information 111. For example, if n is 4, the picking number determination unit 504 determines a sequence of a first target picking number to a fourth target picking number so that the first target picking number*the second target picking number*the third target picking number*the fourth target picking number is equal to or greater than m.

Here, in a manner similar to the topological structure C formed from the two-stage topological structure, there may be a plurality of sequences of the first target picking number, . . . , and the n-th target picking number whose product of the first target picking number to the n-th target picking number is the same value. In this case, the number of picked topological structures is (first target picking number* . . . *n-th target picking number/first target picking number) + . . . + (first target picking number* . . . *n-th target picking number/n-th target picking number). Thus, the picking number determination unit 504 may employ a sequence of a first target picking number, . . . , and an n-th target picking number for which (first target picking number* . . . *n-th target picking number/first target picking number) + . . . + (first target picking number* . . . *n-th target picking number/n-th target picking number) is smaller.

Figure 13:
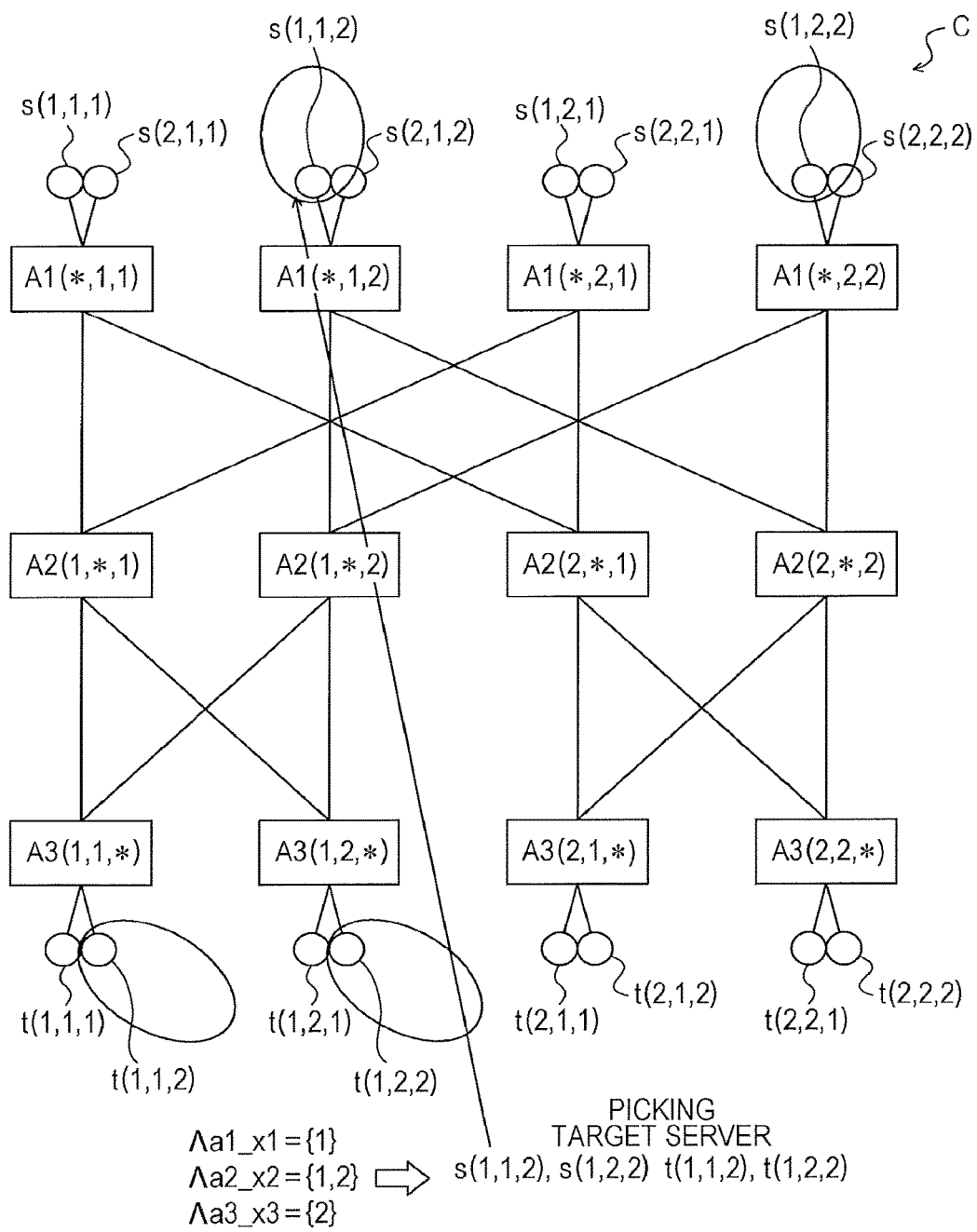
FIG. 13 is a diagram illustrating an example of a picking operation, according to an embodiment.

The picking server determination unit 505 determines, based on the determined i-th target picking number of input port IDs corresponding to the i-th target picking number, picking target servers for performing All-to-All communication without link congestion, from among the plurality of transmission sources and the plurality of transmission destinations. FIG. 13 illustrates an example of determining picking target servers in the topological structure C formed from the n-stage topological structure. Descriptions of processing of the units of the specifying unit 506 to the power-supply constraint unit 509 in the topological structure C formed from the n-stage topological structure will be not repeated because the processing is the same as that in the topological structure C formed from the two-stage topological structure.

Next, the topological structure C which allows bidirectional All-to-All communication without link congestion will be described. As described above, the topological structure C which allows bidirectional All-to-All communication without link congestion satisfies all the three conditions which have been described with the units of the duplication unit 501 to the creation unit 503. Further, it is desired that the topological structures satisfy the following conditions. Assume that j is a natural number of 1 to ((n−1)/2). In this case, an ID-set of the sequence of j-th ID-sets that corresponds to an j-th picking number in the sequence of j-th picking numbers for the j-th type of topological structures is identical with an ID-set of the sequence of (n−j+1)th ID-sets, which corresponds to any one of the sequence of (n−j+1)th picking numbers which is equal to the j-th picking number in the sequence of j-th picking numbers.

For example, assume that n is 3 and j is 1. If 2 is provided as the first picking number of a sequence of first picking numbers, the third picking number of a sequence of third picking numbers is 2. Further, if IDs of input ports are the same as each other, the input ports may be used as picking ports.

It is assumed that All-to-All communication is performed between m transmission sources and m transmission destinations via the topological structure C without link congestion, where m is a value that is smaller than a product of the first number to the n-th number. In this case, with reference to the picking information 111, the picking number determination unit 504 determines an i-th target picking number from a sequence of i-th picking numbers, for each i from 1 to n, so that a product of the first target picking number to the n-th target picking number is equal to or greater than m. Further, it is required that the x-th target picking number is equal to the (n−x+1)th target picking number, where x is a natural number of 1 to ((n−1)/2)).

For example, in the case of n=5, it is required that the first target picking number from a sequence of first picking numbers has the same value as that of the fifth target picking number from a sequence of fifth picking numbers, and the second target picking number from a sequence of second picking numbers has the same value as that of the fourth target picking number from a sequence of fourth picking numbers.

Figure 6:
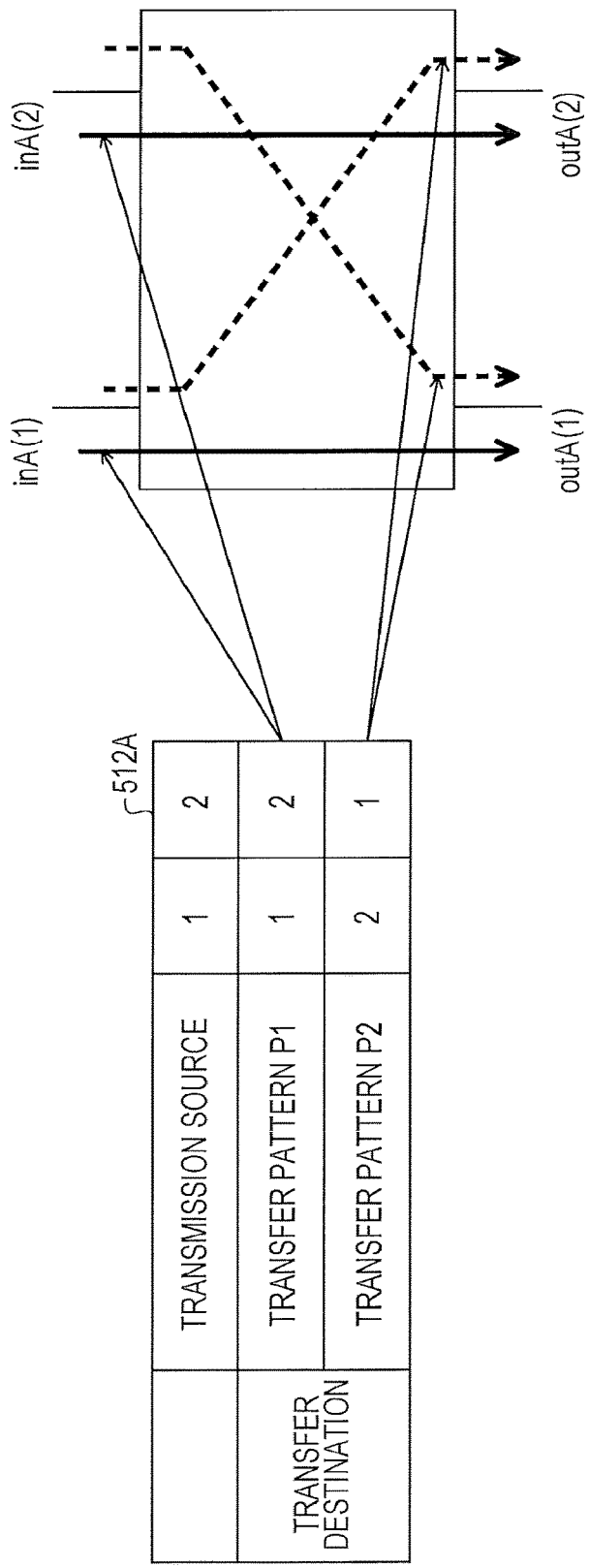
FIG. 6 is a diagram illustrating an example of stored contents of a transfer pattern table, according to an embodiment.

FIG. 6 is a diagram illustrating an example of stored contents of the transfer pattern table 512. As an example, FIG. 6 illustrates the transfer pattern table 512A of the topological structure A in which two input ports and two output ports are provided. In FIG. 6, the two input ports in the topological structure A are respectively represented by inA(1) and inA(2), and the two output ports in the topological structure A are respectively represented by outA(1) and outA(2).

The transfer pattern table 512A includes transfer patterns P1 and P2. The transfer pattern P1 is a pattern for transferring data received from inA(1) as a transmission source by using outA(1), and for transferring data received from inA(2) as a transmission source by using outA(2). The transfer pattern P2 is a pattern for transferring data received from inA(2) by using outA(1), and for transferring data received from inA(1) by using outA(2). In FIG. 6, a flow of data transfer in accordance with the transfer pattern P1 is indicated by an arrow of a solid line, and a flow of data transfer in accordance with the transfer pattern P2 is indicated by an arrow of a broken line.

EXAMPLE 1

In Example 1, a topological structure C formed from a two-stage topological structure will be described. In Example 1, it is assumed that there are provided a topological structure A in which a number a of transmission source servers and a number a of transmission destination servers are provided, and a topological structure B in which a number b of transmission source servers and a number b of transmission destination servers, and further transfer patterns Pi ($1 \leq i \leq a$) and Qj ($1 \leq j \leq b$) without link congestion are provided. In this case, the information processing apparatus 101 constructs a topological structure C which is new and satisfies three conditions as follows. The first condition is that switches used in the topological structure C are the same as those in topological structures A and B. The second condition is that the number of hops from a transmission source server to a transmission destination server in the topological structure C is equal to a value obtained by summing the numbers of hops in the topological structures A and B. The third condition is that unidirectional All-to-All communication without link congestion is possible in the topological structure C.

The topological structure A includes a sequence of first picking numbers: a_1, a_2, . . . , and a_$\lambda$a, and a sequence of first ID-sets of port ID: $\Lambda$a_1, $\Lambda$a_2, . . . , and $\Lambda$a_$\lambda$a, corresponding to the sequence of first picking numbers: a_1, a_2, . . . , and a_$\lambda$a. Here, $\Lambda$a_1 includes a number a_1 of port ID components, $\Lambda$a_2 includes a number a_2 of port ID components, . . . , and $\Lambda$a_$\lambda$a includes a number a_$\lambda$a of port ID components. The number of ID-sets of the port ID components included in each of $\Lambda$a_1 to $\Lambda$a_$\lambda$a may be one or plural.

Similarly, the topological structure B includes a sequence of second picking numbers: b_1, b_2, . . . , and b_$\lambda$b, and a sequence of ID-sets: $\Lambda$b_1, $\Lambda$b_2, . . . , and $\Lambda$b_$\lambda$b corresponding to the sequence of second picking numbers: b_1, b_2, . . . , and b_$\lambda$b.

Figure 7:
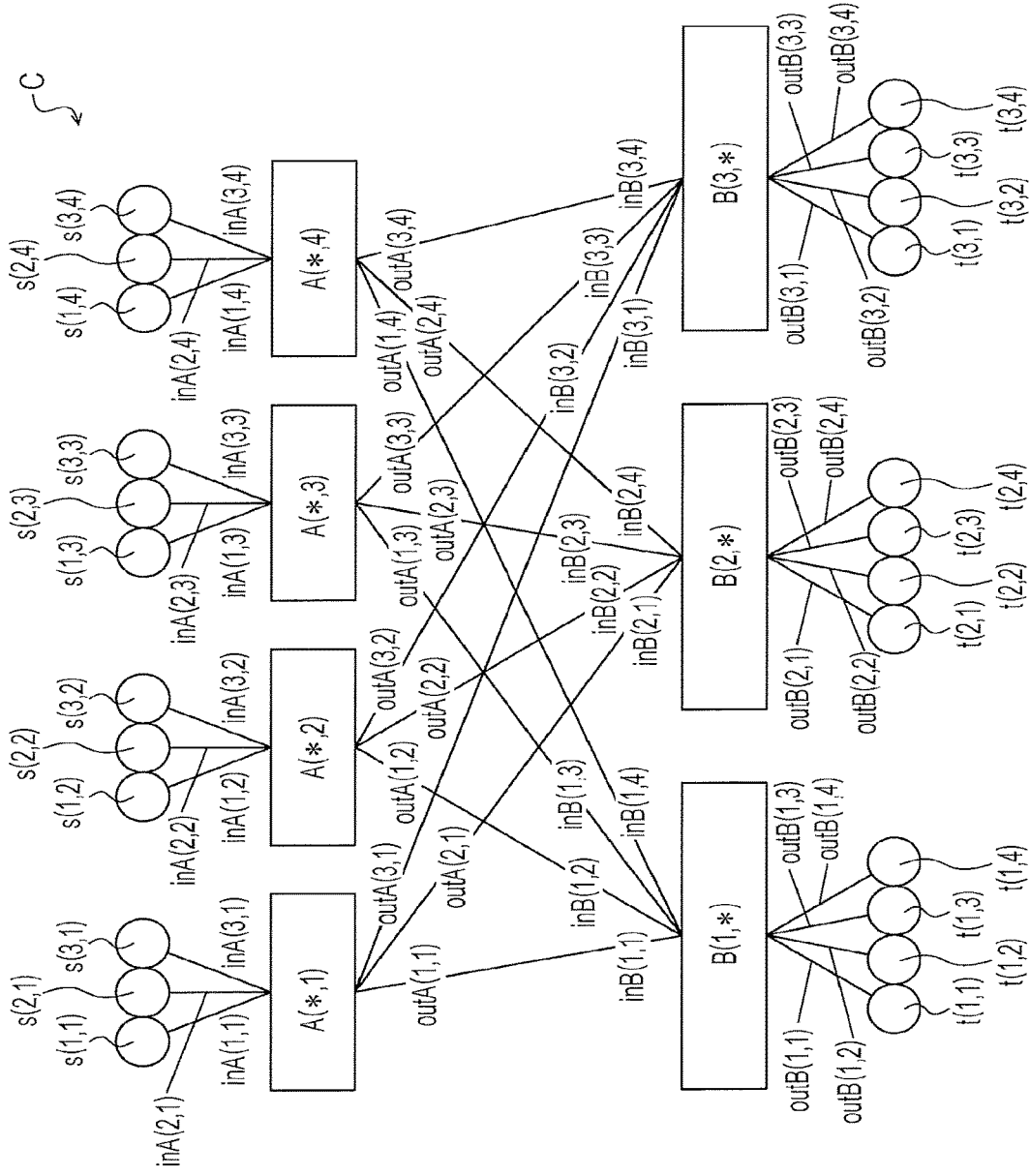
FIG. 7 is a diagram illustrating an example of connection information, according to an embodiment.

FIG. 7 is a diagram illustrating a creation example of connection information 510C in Example 1. Firstly, the information processing apparatus 101 duplicates structure data 511A a number b times. The information processing apparatus 101 sets IDs of the duplicated pieces of structure data 511A as A(*, 1), A(*, 2), . . . , and A(*, b), respectively. The information processing apparatus 101 sets a number a of input ports and a number b of output ports of A(*, j) ($1 \leq j \leq b$), as inA(1, j), outA(1, j), inA(2, j), outA(2, j), . . . , inA(a, j), and outA(a, j), respectively.

Similarly, the information processing apparatus 101 duplicates structure data 511B a number a of times. The information processing apparatus 101 sets IDs of the duplicated pieces of structure data 511B as B(1, *), B(2, *), . . . , and B(a, *), respectively. The information processing apparatus 101 sets a number b of input ports and a number b of output ports of B(i, *) ($1 \leq j \leq b$), as inB(i, 1), outB(i, 1), inB(i, 2), outB(i, 2), . . . , inB(i, b), and outB(i, b), respectively.

The information processing apparatus 101 couples outA(i, j) and inB(i, j) which have the same in-parenthesized sign, as the same link. The information processing apparatus 101 may specify structure data 511B having an in-parenthesized sign which coincides with "*, j" of A(*, j), as structure data 511B to be coupled to A(*, j). Here, it is assumed that "*" is a sign indicating coincidence with any numerical value. In the case of Example 1, A(*, 1), A(*, 2), . . . , and A(*, b) are coupled to B(1, *), B(2, *), . . . , and B(a, *), respectively.

Then, the information processing apparatus 101 couples an input server s(I, j) to a higher link of A(*, j) ($1 \leq j \leq b$). The information processing apparatus 101 couples an output server t(i, j) to a lower link of B(i, *) ($1 \leq i \leq a$).

In the example in FIG. 7, a topological structure C in the case of a=3 and b=4 is illustrated. As illustrated in FIG. 7, A(*, 1), A(*, 2), A(*, 3), and A(*, 4) are coupled to B(1, *), B(2, *), and B(3, *), respectively. The information processing apparatus 101 outputs, as a linking table, the connection information 510C indicating a connection relationship of each of the topological structures A and B. A manager of the topological structure C constructs the topological structure C in accordance with the linking table which has been output.

Figure 8:
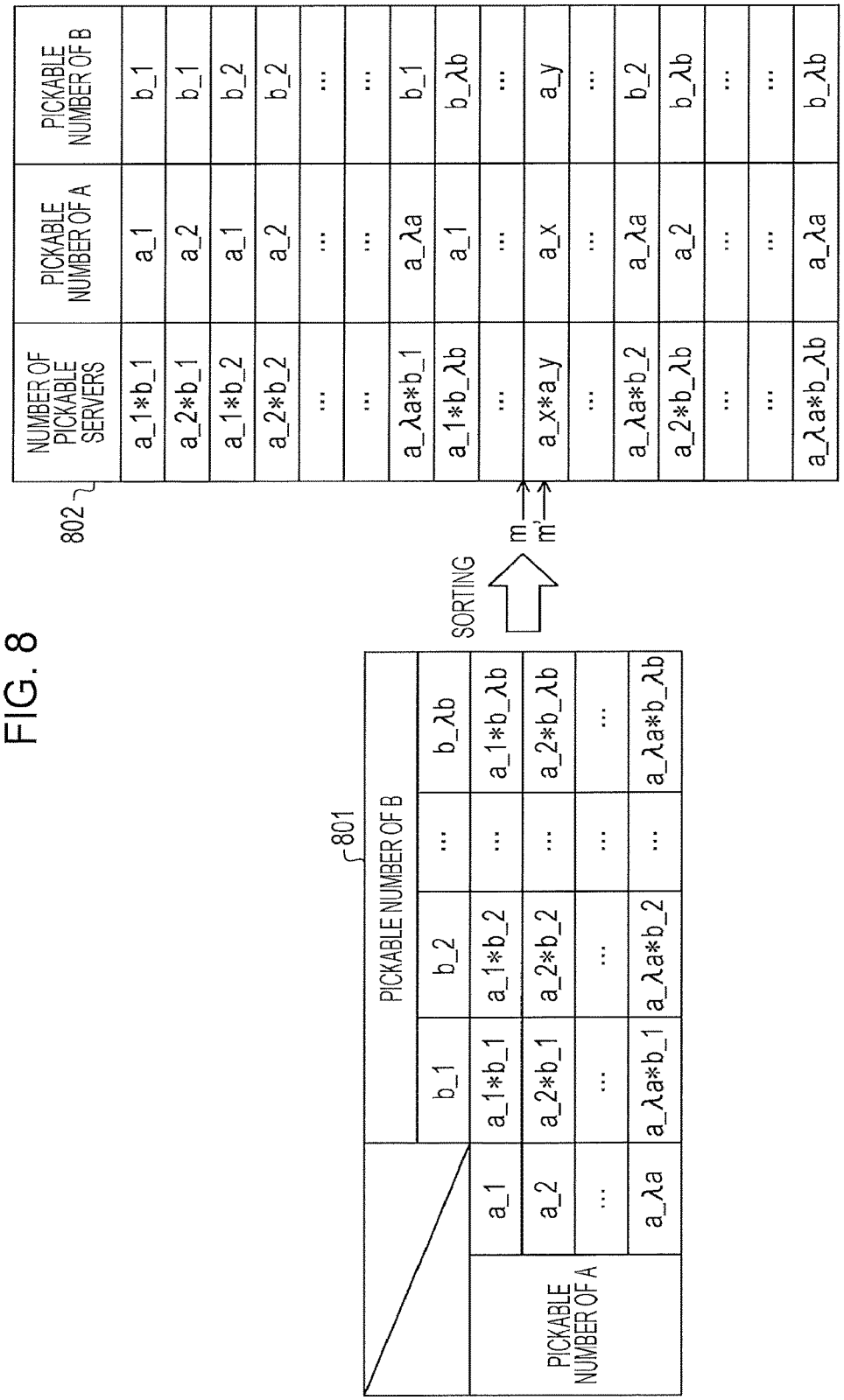
FIG. 8 is a diagram illustrating an example of a picking operation, according to an embodiment.
Figure 9:
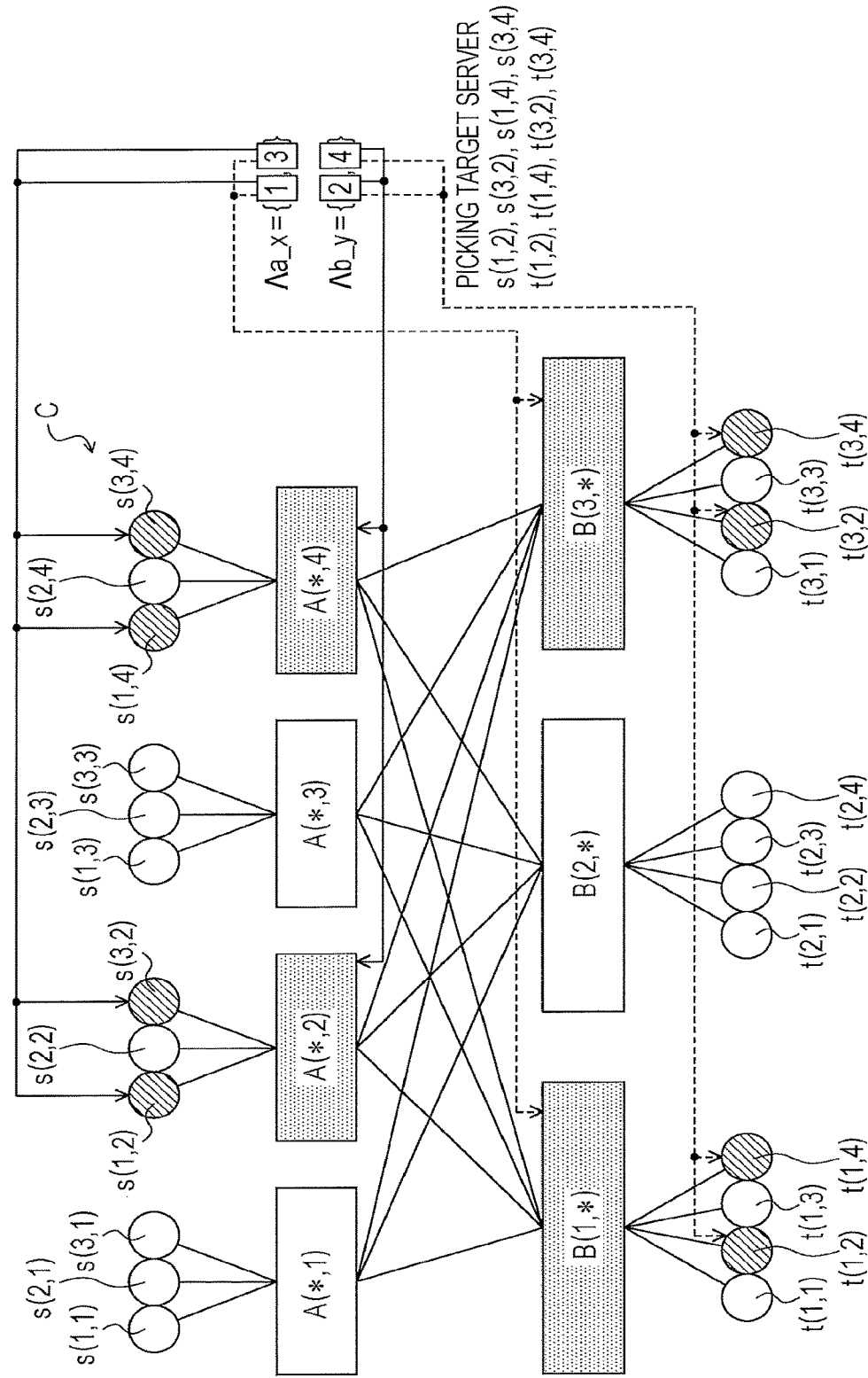
FIG. 9 is a diagram illustrating an example of a picking operation, according to an embodiment.

Next, a creation example of a table will be described with reference to FIGS. 8 to 11. The table is created in order to pick servers whose number is equal to or more than m which is the number of servers to which a job is submitted, from the constructed topological structure C, and to perform All-to-All communication without link congestion among the picked servers. FIG. 8 illustrates an example of determining a number m' indicating the number of servers to be picked. FIG. 9 illustrates an example of determining the number m' of picking target servers. Further, FIG. 10 illustrates an example of creating a transfer pattern table when the number m' of servers are picked from the topological structure C. FIG. 9 illustrates an example of creating an output port table of each switch included in the topological structure C when the number m' of servers are picked from the topological structure C.

FIG. 8 is a diagram (Case 1) illustrating a picking example in Example 1. The information processing apparatus 101 creates a table 801 indicating a product a_i*b_j, that is, a product of the number a_i (i=1, 2, . . . , $\Lambda$a) indicating the number of pickable servers in the topological structure A and the number b_j (j=1, 2, . . . , $\Lambda$b) indicating the number of pickable servers in the topological structure B. The product a_i*b_j is the number of servers pickable from the topological structure C. FIG. 8 illustrates an example of the created table 801. Then, the information processing apparatus 101 creates a list 802 in which the table 801 is sorted by the number of pickable servers. FIG. 8 illustrates an example of the created list 802.

The information processing apparatus 101 determines the minimum value m'=a_x ($1 \leq x \leq \Lambda a$)*b_y ($1 \leq y \leq \Lambda b$) from the list 802 by binary search, where the minimum value m' is a minimum value among values that each indicate the number of pickable servers and are equal to or greater than m. The example in FIG. 8 illustrates positions of m and m' in the list 802.

FIG. 9 is a diagram (Case 2) illustrating a picking example in Example 1. In FIG. 9, m' is set at 4, a_x is set at 2 and b_y is set at 2 as target picking numbers, and an ID-set Λa_x of port ID components corresponding to a_x is set at {1, 3} and an ID-set Λb_y of port ID components corresponding to b_y is set at {2, 4}. The information processing apparatus 101 determines, based on Λa_x and Λb_y, picking target input servers s and picking target output servers t on the topological structure C.

More specifically, the information processing apparatus 101 creates sequences of port ID components by extracting a port ID component from each set of Λa_x and Λb_y. The information processing apparatus 101 determines an input server s(i, j) (i∈Λa_x, j∈Λb_y) and an output server t(i, j) (i∈Λa_x, j∈Λb_y) which each have the same sequence of port ID components as that of the created sequence of port ID components, as a picking target input server s and a picking target output server t which are to be picked. In the example in FIG. 9, the information processing apparatus 101 creates four sequences of port ID components, that is, (1, 2), (1, 4), (3, 2), and (3, 4), by extracting one port ID component from each of sets of Λa_x and Λb_y. The information processing apparatus 101 determines input servers s(1, 2), s(3, 2), s(1, 4), and s(3, 4), and output servers t(1, 2), t(1, 4), t(3, 2), and t(3, 4), which have the same sequences of port ID components as those of the created sequences of port ID components, as picking target servers.

FIG. 9 illustrates the input servers s(1, 2), s(3, 2), s(1, 4), and s(3, 4), and the output servers t(1, 2), t(1, 4), t(3, 2), and t(3, 4), which have been determined as the picking target servers, by hatching with diagonal lines. In FIG. 9, the topological structure A(*, 2) coupled to the input servers s(1, 2) and s(3, 2) which have been determined as the picking target servers, and the topological structure A(*, 4) coupled to the input servers s(1, 4) and s(3, 4) which have been determined as the picking target servers, are denoted by thin hatching. Similarly, the topological structure B(1, *) coupled to the output servers t(1, 2) and t(1, 4) which have been determined as the picking target servers, and the topological structure B(3, *) coupled to the output servers t(3, 2) and t(3, 4) which have been determined as the picking target servers, are denoted by thin hatching.

As another determining method, the information processing apparatus 101 determines A(*, 2) and A(*, 4) having the second component of the in-parenthesized sign, which is the same as Λb_y={2, 4}, among the topological structures A(*, 1) to A(*, 4), as a topological structure to be picked. The information processing apparatus 101 determines the input servers s(1, 2), s(3, 2), s(1, 4), and s(3, 4) having the first component of the in-parenthesized sign, which is the same as Λa_x={1, 3}, among the input servers coupled to A(*, 2) and A(*, 4), as the picking target servers.

Similarly, the information processing apparatus 101 determines B(1, *) and B(3, *) having the first component of the in-parenthesized sign, which is the same as Λa_x={1, 3}, among the topological structures B(1, *) to B(3, *), as a topological structure to be picked. The information processing apparatus 101 determines the output servers t(1, 2), t(1, 4), t(3, 2), and t(3, 4) having the second component which is the same as Λb_y={2, 4}, among the output servers connected to B(1, *) and B(3, *), as the picking target servers.

FIG. 10 is a diagram illustrating an example of a transfer pattern at a time of picking. The information processing apparatus 101 creates a transfer pattern table 512C_m' in a case where the number m' of servers are picked from the topological structure C. At this time, the information processing apparatus 101 creates the transfer pattern table 512C_m' by using the connection information 510C, a transfer pattern table 512A_x, and a transfer pattern table 512B_y. Here, the transfer pattern table 512A_x stores a transfer pattern corresponding to a set Λa_x of port ID components of the topological structure A, and is a portion of the transfer pattern table 512A illustrated in FIG. 5. The transfer pattern table 512A_x includes the number a_x of transfer patterns. Similarly, the transfer pattern table 512B_y stores a transfer pattern corresponding to a set Λb_y of port ID components of the topological structure B, and is a portion of the transfer pattern table 512B illustrated in FIG. 5. The transfer pattern table 512B_y includes the number b_y of transfer patterns. In the following descriptions, the number a_x of transfer patterns provided in the transfer pattern table 512A_x are referred to as P1, P2, . . . , and Pa_x, respectively. Similarly, the number b_y of transfer patterns provided in the transfer pattern table 512B_y are referred to as Q1, Q2, . . . , and Qb_y.

In a case where the number m' of servers are picked out, transfer patterns whose number is equal to a_x*b_y in total are provided. Thus, the information processing apparatus 101 performs (Pi, Qj) patterns (i=1, 2, . . . , and a_x, j=1, 2, . . . , and b_y) in accordance with the connection information 510C, and specifies the output server t as a transmission destination of the input server s corresponding to each of the patterns. Here, the (Pi, Qj) indicates a pattern that performs the transfer pattern Pi in all A(*, j) (j=1, 2, . . . , and b) of the topological structure C, and performs the transfer pattern Qj in all B(i, *) (i=1, 2, . . . , and a) thereof. The information processing apparatus 101 creates, from the specified output servers t, the transfer pattern table 512C_m' of the topological structure C that indicates output servers t corresponding to a combination of the transfer patterns and the transmission source. In the following descriptions, an example of the (Pi, Qj) patterns and a creation example of the transfer pattern table 512C_m' will be described with reference to FIG. 10.

As transfer patterns when the number m' of servers are picked from the topological structure C illustrated in FIG. 10, four (2*2=4) combinations of transfer patterns are generated because a_x=2 and b_y=2. FIG. 10 illustrates a (P1, Q2) combination among the four combinations of transfer patterns. Firstly, an example in which the transmission source is the input server s(1, 2) will be described. In the case of the transfer pattern P1, the information processing apparatus 101 specifies that transmission from inA(1, 2) of the topological structure A(*, 2) is transferred to outA(1, 2), with reference to the transfer pattern table 512A_x.

Here, when referring to the transfer pattern table 512, the information processing apparatus 101 focuses on a component at a position of "*" in the in-parenthesized sign assigned to the topological structure. Thus, the information processing apparatus 101 specifies that transmission from inA(1, 2) corresponds to a transmission source of "1" in the transfer pattern table 512A_x, and specifies a transfer destination of "1" in the transfer pattern P1. The information processing apparatus 101 specifies that transmission from inA(1, 2) is transferred to outA(1, 2) corresponding to the transfer destination of "1".

Then, the information processing apparatus 101 specifies that an input port coupled to outA(1, 2) is inB(1, 2) of the topological structure B(1, *), with reference to the connection information 510C. The information processing apparatus 101 specifies that transmission from inB(1, 2) of the topological structure B(1, *) is transferred to outB(1, 4), with reference to the transfer pattern table 512B_y. Here, when referring to the transfer pattern table 512B_y, the information processing apparatus 101 focuses on the second components of inB and outB by a method which is similar to that in the descriptions of the topological structure A(*, 2). The information processing apparatus 101 specifies that transmission from the input server s(1, 2) is finally transferred to the output server t(1, 4) coupled to outB(1, 4).

With the above processing, the information processing apparatus 101 specifies a path 1001 from s(1, 2) to t(1, 4) in the (P1, Q2) pattern.

Since the path 1001 is specified, the information processing apparatus 101 determines a combination of s(1, 2) and t(1, 4) in the (P1, Q2) pattern, based on the path 1001. The combination of s(1, 2) and t(1, 4) is one component of the transfer pattern table 512C_m'. Thus, the information processing apparatus 101 registers "t(1, 4)" in the corresponding position of the transfer pattern table 512C_m'. Similarly, the information processing apparatus 101 specifies the transmission destination to be the output server t(3, 2) when the transmission source is the input server s(3, 4). Thus, the information processing apparatus 101 specifies a path 1002 from s(3, 4) to t(3, 2) in the (P1, Q2) pattern. Since the path 1002 is specified, the information processing apparatus 101 registers "t(3, 2)" in the corresponding position of the transfer pattern table 512C_m'. The information processing apparatus 101 also performs similar procedures on other transmission sources and other transfer patterns and registers all transmission destinations in the transfer pattern table 512C_m'.

When all of the transmission destinations in the transfer pattern table 512C are registered, the information processing apparatus 101 transmits the transfer pattern table 512C to the input servers s(1, 2), s(3, 2), s(1, 4), and s(3, 4).

FIG. 11 is a diagram illustrating an example of the output port table at the time of picking. The information processing apparatus 101 performs processing of creating the output port table of each switch along with processing of setting each transmission destination of the transfer pattern table 512C. FIG. 11 illustrates a creation example of an output port table 513A(*, 2) of the topological structure A(*, 2) and an output port table 513B(1, *) of the topological structure B(1, *).

In the example in FIG. 11, the information processing apparatus 101 is in a state after the path 1001 is specified. In this case, the information processing apparatus 101 specifies an output port of a topological structure on the path 1001. For example, the information processing apparatus 101 specifies that the output port of the topological structure on the path 1001 is outA(1, 2) in the topological structure A(*, 2). Thus, the information processing apparatus 101 registers "outA(1, 2)" in the output port table 513A(*, 2), in association with the combination of the transmission source s(1, 2) and the transmission destination t(1, 4). Similarly, the information processing apparatus 101 specifies that the output port of the topological structure on the path 1001 is outB(1, 4) in the topological structure B(1, *). Thus, the information processing apparatus 101 registers "outB(1, 4)" in the output port table 513B(1, *), in association with the combination of the transmission source s(1, 2) and the transmission destination t(1, 4).

Similarly, when an output port corresponding to the combination of the transmission source and the transmission destination in each of the topological structures in the topological structure C is specified, the information processing apparatus 101 sets the specified output port at the corresponding position in the output port table 513 of each of the topological structures. When all picked output ports in each of the topological structures are set, the information processing apparatus 101 transmits the output port table 513 corresponding to each of the topological structures, to the corresponding topological structure. In the example in FIG. 11 the information processing apparatus 101 transmits the output port table 513 corresponding to each of the topological structures, to the topological structures A(*, 2), A(*, 4), B(1, *), and B(3, *) on the paths from the picked input servers to the picked output servers.

The information processing apparatus 101 transmits the transfer pattern table 512 to each of the picked input servers, and transmits the corresponding output port table 513 to each of the topological structures on the path from each of the input servers to the output server, thereby allowing the input server to perform All-to-All communication without link congestion.

Here, the information processing apparatus 101 may block a supply of power to servers other than the picking target servers or cause the servers to enter a standby mode, as a way of constraining a supply of power to the servers. Thus, with the topological structure C, it is possible to reduce consumed power and computed resources are effectively utilized. Similarly, the information processing apparatus 101 may block the supply of power to a topological structure which is not provided on the paths from the input servers to the output servers or cause the topological structure to enter a state in which the quantity of the consumed power is smaller than that for the normal time. Here, in the example in FIG. 11, the topological structures A(*, 1), A(*, 3), and B(2, *) are provided as the topological structure which is not provided on the paths from the input servers to the output servers.

Next, demonstration that All-to-All communication without link congestion is performed from input servers to output servers, which are picked from the topological structure C described in Example 1, will be described. Here, the number of times of transmission from the input server s(x, y) (x∈Λa_x, y∈Λb_y) to the output server t(z, w)(z∈Λa_x, w∈Λb_y) is counted. Firstly, a topological structure used for being transmitted from the input server s(x, y) is limited to the topological structure A(*, y) in the topological structure C. Similarly, a topological structure used for being transmitted to the output server t(z, w) is limited to the topological structure B(z, *) in the topological structure C. The topological structure A(*, y) and the topological structure B(z, *) are coupled to each other via only one link determined under conditions that outA(z, y)=inB(z, y). Accordingly, the number of times of transmission from the input server s(x, y) to the output server t(z, w) is limited to one time.

EXAMPLE 2

Figure 12:
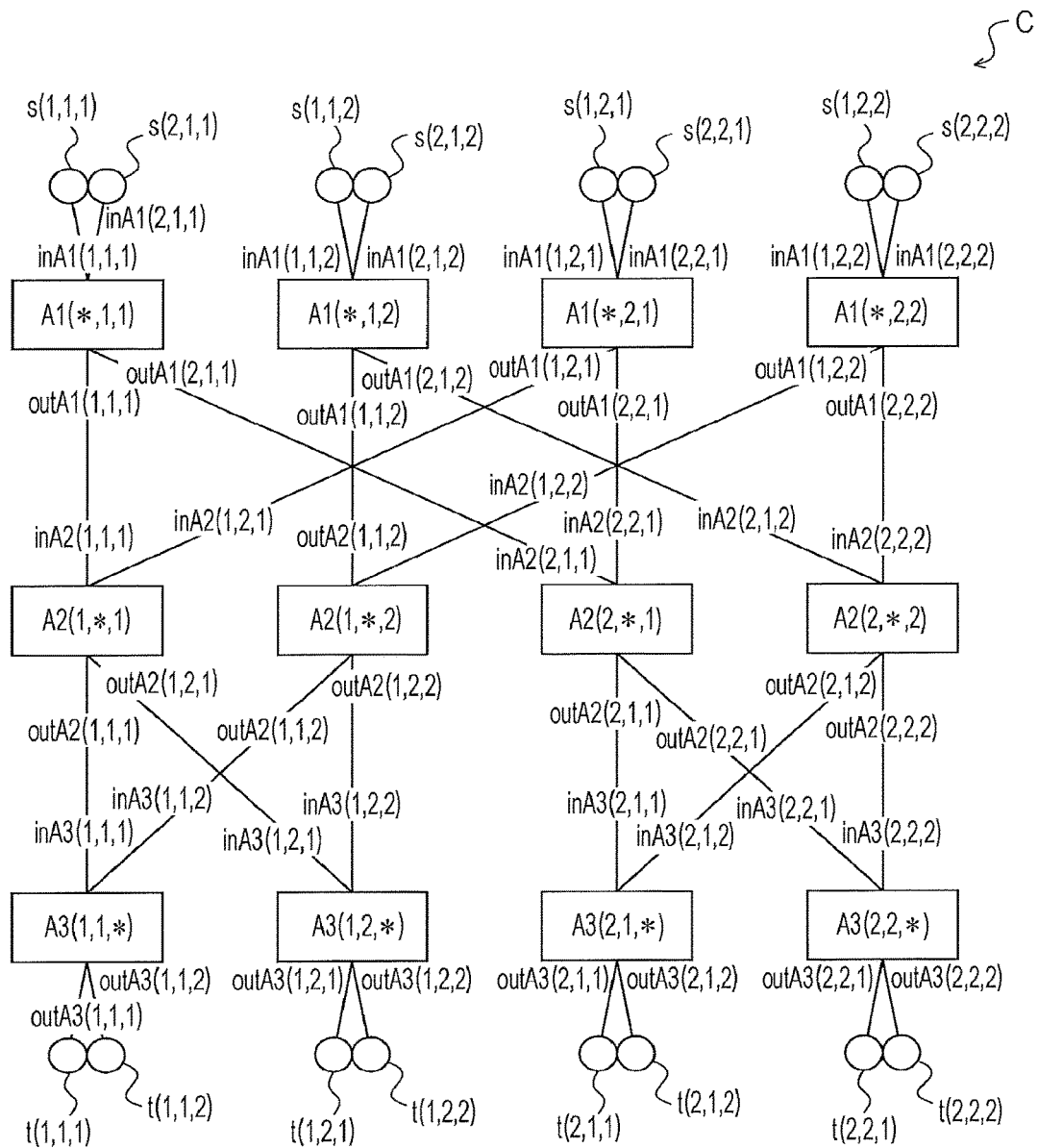
FIG. 12 is a diagram illustrating an example of connection information, according to an embodiment.

In Example 1, the example of the topological structure C formed by the topological structures A and B at two stages is described. However, in Example 2, an example of a topological structure C formed by an n-stage topological structure, where n is equal to or greater than 3, will be described with reference to FIGS. 12 and 13. FIG. 12 illustrates a creation example of connection information 510 in Example 2. FIG. 13 illustrates a picking example from the n-stage topological structure C.

FIG. 12 is a diagram illustrating a creation example of the connection information 510 in Example 2. In Example 2, it is assumed that there are provided a topological structure A1 having the number a1 of input servers and the number a1 of output servers are provided, a topological structure A2 having the number a2 of input servers and the number a2 of output servers, . . . , and a topological structure An having the number an of input servers and the number an of output servers, where n is an integer of 2 or more. In the case where n is 2, a topological structure similar to that in Example 1 is obtained.

Firstly, the information processing apparatus 101 sets the number P indicating the number of input servers and the number of output servers in a new topological structure C formed from an n-stage topological structure, at a1* a2* . . . *an. The information processing apparatus 101 duplicates structure data 511Ai (i=1, 2, . . . , n) indicating a topological structure Ai, the number of P/Ai times.

The information processing apparatus 101 sets an ID of the duplicated structure data 511Ai at Ai(j1, j2, . . . , j(i−1), *, j(i+1), . . . , jn). In a sequence of "j1, j2, . . . , j(i−1), *, j(i+1), . . . , jn", the i-th component is "*" and other components are jk (k=1, 2, . . . , n) where jk satisfies 1≤jk≤ak. The number of values allowed to be taken by j coincides with P/Ai.

The information processing apparatus 101 sets input ports of A(j1, j2, . . . , j(i−1), *, j(i+1), . . . , jn) at inAi(j1, j2, . . . , j(i−1), k, j(i+1), . . . , jn) (k=1, 2, . . . , ai). Similarly, the information processing apparatus 101 sets output ports of A(j1, j2, . . . , j(i−1), *, j(i+1), . . . , jn) at outAi(j1, j2, . . . , j(i−1), k, j(i+1), . . . , jn) (k=1, 2, . . . , ai).

Then, the information processing apparatus 101 couples outAi and inA(i+1) having the same in-parenthesized sign as one link. The information processing apparatus 101 may specify structure data 511A(i+1) having an in-parenthesized sign which coincides with the in-parenthesized sign of Ai, as structure data 511 to be coupled to Ai.

Here, a specific example of coupling processing between an input port and an output port will be described with reference to FIG. 12. In FIG. 12, it is assumed that n=3 and a1=a2=a3=2. Thus, P=2*2*2=8 is satisfied. Then, the information processing apparatus 101 duplicates each of structure data 511A1 to 511A3 four times. The information processing apparatus 101 sets IDs of the four duplicated pieces of structure data 511A1, at A1(*, 1, 1), A1(*, 1, 2), A1(*, 2, 1), and A1(*, 2, 2), respectively. Similarly, the information processing apparatus 101 sets IDs of the four duplicated pieces of structure data 511A2, at A2(1, *, 1), A2(1, *, 2), A2(2, *, 1), and A2(2, *, 2), respectively. The information processing apparatus 101 sets IDs of the four duplicated pieces of structure data 511A3, at A3(1, 1, *), A3(1, 2, *), A3(2, 1, *), and A2(2, 2, *), respectively. The information processing apparatus 101 sets input ports and output ports of A1(*, 1, 1) at inA1(1, 1, 1), inA1(2, 1, 1), outA1(1, 1, 1), and outA1(2, 1, 1). The information processing apparatus 101 sets IDs in other input ports and other output ports by a similar command rule.

The information processing apparatus 101 couples outAi and inA(i+1) having the same in-parenthesized sign, as one link. For example, outA1(1, 1, 1) and inA2(1, 1, 1) are coupled to each other as one link. The information processing apparatus 101 may specify structure data 511A(i+1) having an in-parenthesized sign which coincides with the in-parenthesized sign of Ai, as structure data 511 to be coupled to Ai. For example, there are A2(1, *, 1) and A2(2, *, 1) as A2 having the same in-parenthesized sign as that of A1(*, 1, 1). In this manner, in a topological structure having three stages or more, a topological structure for which adjacent stages are not coupled is also included.

Other pieces of structure data 511 are also coupled to each other, and thus the information processing apparatus 101 obtains the topological structure C illustrated in FIG. 12. After the topological structure C is obtained, servers whose number is equal to n' are picked from the constructed topological structure C, where n' is equal to or greater than n which is the number of servers to which a job is desired to be submitted. An example of picking servers in Example 2 will be described with reference to FIG. 13.

In Example 2, when input servers s(j1, j2, . . . , jn) perform transmission to output servers t(k1, k2, . . . , kn), "j1, j2, . . . , jn" is modified for each component in each of the topological structures, thereby allowing all input servers s to perform transmission to all output servers t.

FIG. 13 is a diagram illustrating a picking example in Example 2. Similar to Example 1, the information processing apparatus 101 creates a table of a product a1_i1* . . . *an_in, that is, a product of the number a1_i1 (i1=1, 2, . . . , Λ1) of pickable servers of the topological structure A1, . . . , and the number of an_in (in=1, 2, . . . , Λn) of pickable servers of the topological structure An, where a1_i1* . . . *an_in is the number of servers which are pickable from the topological structure C having n stages. This table of a1_i1* . . . *an_in is obtained by expanding the table 801 illustrated in FIG. 8 to have n dimensions, and illustration of this table will be omitted. Then, the information processing apparatus 101 creates a list obtained by sorting the table of a1_i1* . . . *an_in by the number of pickable servers.

The information processing apparatus 101 determines the minimum value m'=a1_x1 (1≤x1≤Λ1)* . . . *an_xn (1≤xn≤Λn), from the created list by binary search, where the minimum value m' is the number of pickable servers and equal to or greater than m.

Then, the information processing apparatus 101 determines input servers s and output servers t which are to be picked, based on a set Λa1_x1 of port ID components corresponding to a1_x1, . . . , and a set Λan_xn of port ID components corresponding to an_xn. Specifically, the information processing apparatus 101 generates a sequence of port ID components by extracting one port ID component from each of ID-sets of Λa1_x1, . . . , and Λan_xn of port ID components. The information processing apparatus 101 determines an input server s and an output server t which have the same sequence of port ID components as that of the generated sequence of port ID components, as the picking target servers.

In the example in FIG. 13, it is assumed that n=3, m'=2, a1_x1=1, a2_x2=2, and a3_x3=1. Further, it is assumed that Λa1_x1={1}, Λa2_x2={1, 2}, and Λa3_x3={2}. In this case, the information processing apparatus 101 generates (1, 1, 2) and (1, 2, 2) as the sequences of IDs obtained by extracting one port ID component from each of sets of Λa1_x1, Λa2_x2, and Λa3_x3 of port ID components. The information processing apparatus 101 determines input servers s(1, 1, 2) and s(1, 2, 2) and output servers t(1, 1, 2) and t(1, 2, 2) which have the same suffix as that of the generated sequence of IDs, as the picking target servers.

After the information processing apparatus 101 determines the picking target server, the information processing apparatus 101 creates a transfer pattern table and an output port table, in order to perform All-to-All communication without link congestion between the picking target servers.

Descriptions of methods of creating this two tables will be not repeated because the methods are similar to that in Example 1.

Next, flowcharts of connection information creation processing, a transfer pattern table, and an output port table in the topological structure C in Examples 1 and 2 will be described with reference to FIGS. 14 to 16.

Figure 14:
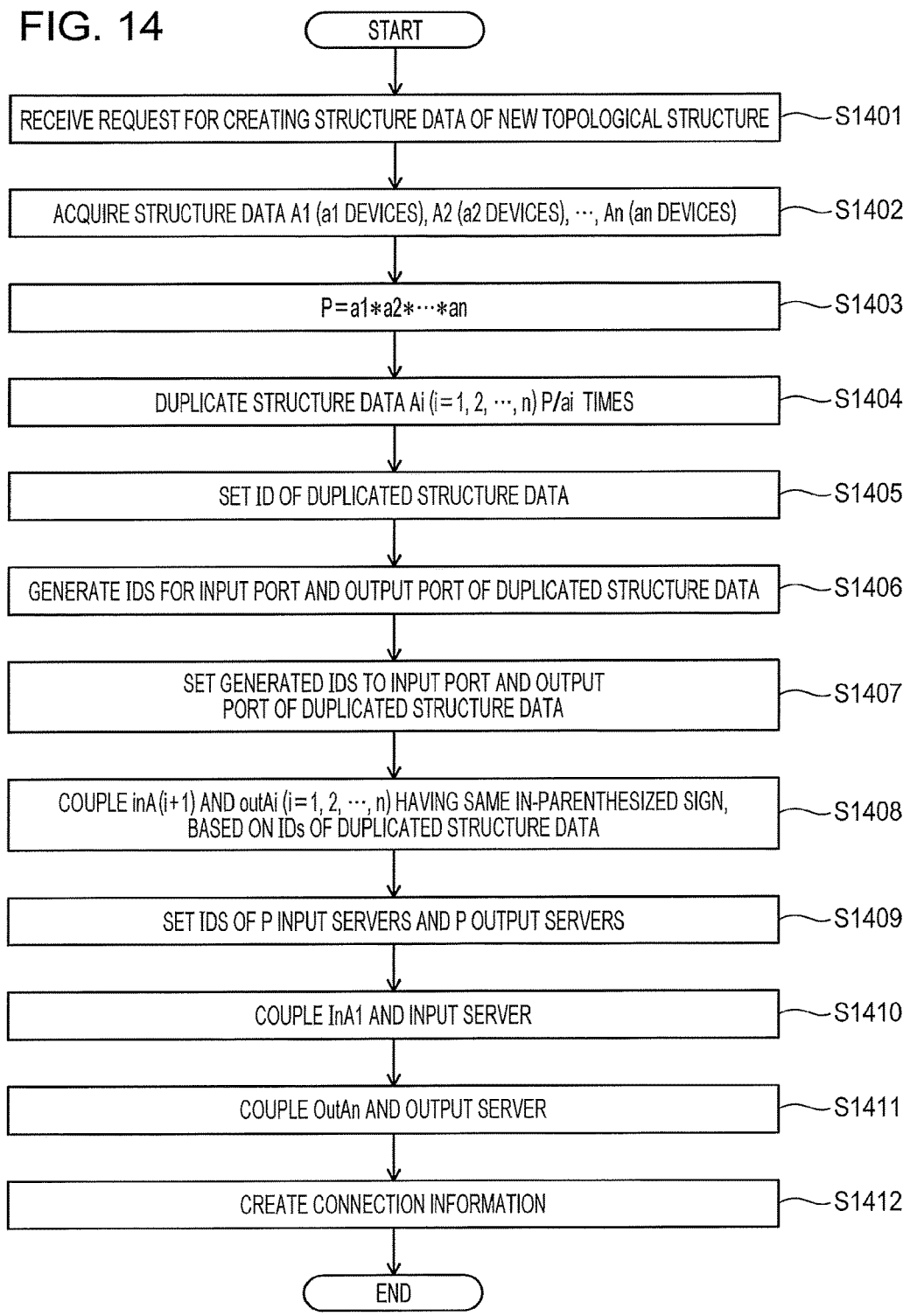
FIG. 14 is a diagram illustrating an example of an operational flowchart for processing of creating connection information of a topological structure, according to an embodiment.

FIG. 14 is a flowchart illustrating an example of procedures of the connection information creation processing for the topological structure. The information processing apparatus 101 receives a creation request of structure data of a new topological structure by an operation which is performed by a user of the information processing apparatus 101 (Step S1401). The creation request includes an instruction of the number of stages for topological structures used for a new topological structure, and information of designating a topological structure corresponding to each of the stages. Here, it is assumed that topological structure to be constructed is an n-stage topological structure where n is a natural number of 2 or more, and the n-stage topological structure are topological structures A1, A2, . . . , and An.

The information processing apparatus 101 acquires pieces of structure data A1 (a1 servers), A2 (a2 servers), . . . , and An (an servers), from the storage unit 110 in accordance with the creation request (Step S1402). Then, the information processing apparatus 101 puts a value obtained by calculating a1*a2* . . . *an, in P (Step S1403). The information processing apparatus 101 duplicates structure data Ai (i=1, 2, . . . , n) P/ai times (Step S1404). Then, the information processing apparatus 101 sets IDs of the duplicated pieces of structure data (Step S1405).

The information processing apparatus 101 generates IDs of input ports inAi and output ports outAi of the duplicated structure data (Step S1406). Then, the information processing apparatus 101 sets the generated IDs in the input ports inAi and the output ports outAi of the duplicated structure data (Step S1407). The information processing apparatus 101 couples outAi (i=1, 2, . . . , n) and inA(i+1) based on the set IDs of the input ports inAi and the output ports outAi. The coupled outAi and inA(i+1) have the same in-parenthesized sign (Step S1408). In Example 1, the information processing apparatus 101 may couple OutA1 and inA2 in Fat-Tree.

Then, the information processing apparatus 101 sets IDs of P input servers s and P output servers t. (Step S1409). The information processing apparatus 101 couples inA1 and the input server s (Step S1410). The information processing apparatus 101 couples outAn with the output server (Step S1411). The information processing apparatus 101 creates connection information 510C which includes the duplicated topological structures A1, A2, . . . , and An, information on input servers s, information on output servers t, and a connection relationship between each of the topological structures and the servers (Step S1412). After the process of Step S1412 is ended, the information processing apparatus 101 ends the connection information creation processing of the topological structure.

Figure 15:
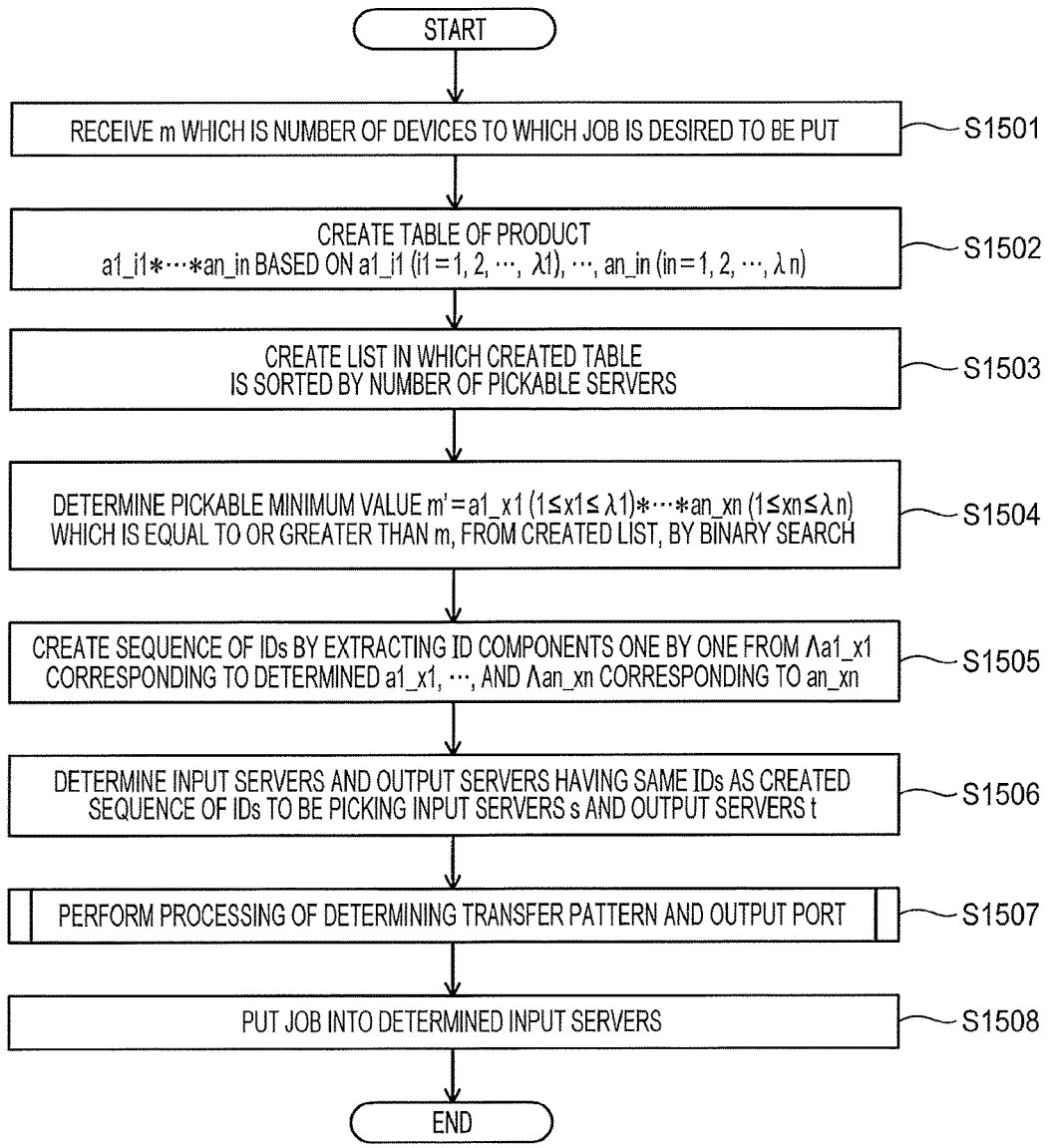
FIG. 15 is a diagram illustrating an example of an operational flowchart for processing of determining picking target servers, according to an embodiment.

FIG. 15 is a flowchart illustrating an example of procedures of determination processing of the picking target server. The information processing apparatus 101 receives m which is the number of servers to which a job is desired to be submitted in a new topological structure by an operation which is performed by a user of the information processing apparatus 101 (Step S1501).

Then, the information processing apparatus 101 creates a table of a product a1_i1* . . . *an_in, based on a1_il (i1=1, 2, . . . , A1), . . . , and an_in (in=1, 2, . . . , An) (Step S1502).

The information processing apparatus 101 creates a list obtained by sorting the created table by the number of pickable servers (Step S1503).

Then, the information processing apparatus 101 determines the minimum value m'=a1_x1 (1≤x1≤ A1)* . . . *an_xn (1≤xn≤An), from the created list, by means of binary search, where the minimum value m' is equal to or greater than m and is the number of pickable servers (Step S1504). The information processing apparatus 101 creates a sequence of IDs by extracting one ID component one by one from Aa1_x1 corresponding to determined a1_x1, . . . , and Aan_xn corresponding to determined an_xn (Step S1505). Here, the number of the created sequences of IDs becomes equal to a1_x1* . . . *an_xn.

Then, the information processing apparatus 101 determines input servers and output servers which have the same IDs as those of the created sequence of IDs, as input servers s and output servers t which are to be picked (Step S1506). The information processing apparatus 101 performs transfer pattern and output port determination processing (Step S1507). FIG. 16 illustrates the transfer pattern and output port determination processing.

After the process of Step S1507 is ended, the information processing apparatus 101 submits a job to the determined input servers (Step S1508). After the process of Step S1508 is ended, the information processing apparatus 101 ends the determination processing of the picking target server.

Figure 16:
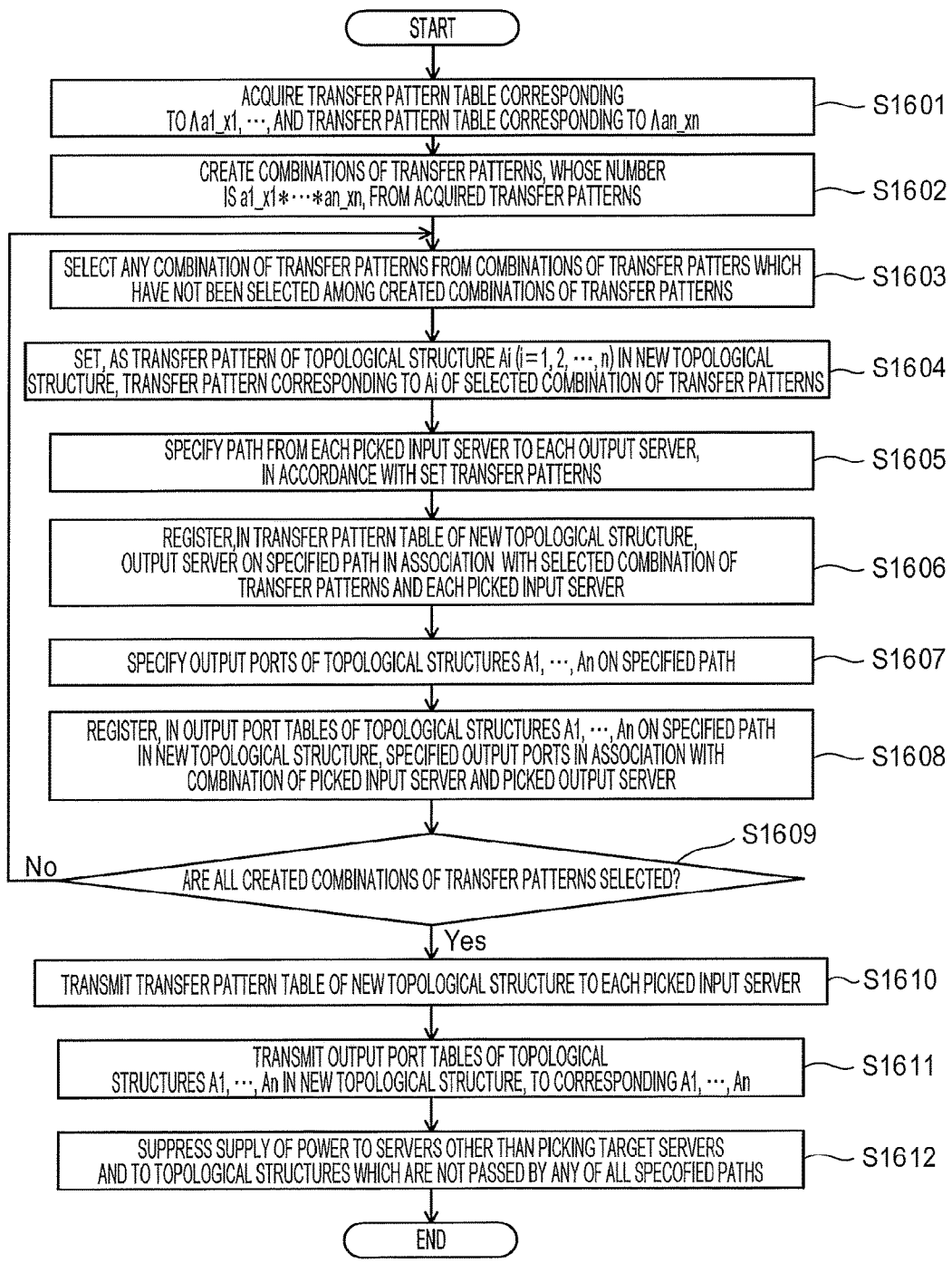
FIG. 16 is a diagram illustrating an example of an operational flowchart for processing of determining transfer patterns and output ports, according to an embodiment.

FIG. 16 is a flowchart illustrating an example of procedures of the transfer pattern and output port determination processing. The information processing apparatus 101 acquires a transfer pattern table corresponding to Aa1_x1, . . . , and a transfer pattern table corresponding to Aan_xn (Step S1601). Then, the information processing apparatus 101 creates combinations of transfer patterns, whose number is equal to a1_x1* . . . *an_xn, from the acquired transfer patterns (Step S1602). The process of Step S1602 will be described using the example in FIG. 10. In this case, n is 2. In Step S1602, Aa1_x1 becomes Aa_x, and Aa2_x2 becomes Ab_y. The information processing apparatus 101 creates combinations of transfer patterns: (P1, Q1), (P1, Q2), (P2, Q1), and (P2, Q2), from transfer patterns P1 and P2 for Aa_x and transfer patterns Q1 and Q2 for Ab_y.

Then, the information processing apparatus 101 selects one combination from the created combinations of transfer patterns (Step S1603). Then, the information processing apparatus 101 sets, as a transfer pattern of topological structures Ai (i=1, 2, . . . , n) in the new topological structure C, the transfer pattern corresponding to Ai of the selected combination of transfer patterns (Step S1604). The information processing apparatus 101 specifies a path from each picked input server to each output server in accordance with the set transfer patterns (Step S1605).

Then, the information processing apparatus 101 registers an output server on the specified path, in a transfer pattern table of the new topological structure C, in association with the selected combination of transfer patterns and the picked input server (Step S1606). The information processing apparatus 101 specifies output ports of topological structures A1, . . . , and An on the specified path (Step S1607).

Then, the information processing apparatus 101 registers the specified output ports, in output port tables of the topological structures A1, . . . , and An on the specified path in the new topological structure C, in association with a combination of the input server and the output server which are to be picked (Step S1608). The information processing apparatus 101 determines whether or not all of the created combinations of transfer patterns are selected (Step S1609).

When there is a combination of transfer patterns which has not been selected among the created combinations of transfer patterns (Step S1609: No), the information processing apparatus 101 causes the process to proceed to Step S1603. Thus, the processes of Steps S1603 to S1609 are repeated a1_x1* . . . *an_xn times. The processes of Steps S1603 to S1609 may be implemented, for example, as n loop processes forming a nested structure.

When all of the created combinations of transfer patterns are selected (Step S1609: Yes), the information processing apparatus 101 transmits the transfer pattern table of the new topological structure C to each of the picked input servers (Step S1610). Then, the information processing apparatus 101 transmits output port tables of the topological structures A1, . . . , and An in the new topological structure, to the corresponding A1, . . . , and An (Step S1611). The information processing apparatus 101 performs setting to suppress the supply of power to servers other than the picking target server and to topological structures which are not passed by any of all paths (Step S1612). After the process of Step S1612 is ended, the information processing apparatus 101 ends the transfer pattern and output port determination processing.

EXAMPLE 3

In Examples 1 and 2, the topological structure which allows unidirectional All-to-All communication without link congestion has been described. In Example 3, a topological structure which allows bidirectional All-to-All communication without link congestion will be described. The bidirectional All-to-All communication without link congestion means that unidirectional All-to-All communication without link congestion is performed, and communication from a group of input servers to the group of input servers and communication from a group of output servers to the group of output servers are performed without link congestion.

Figure 17:
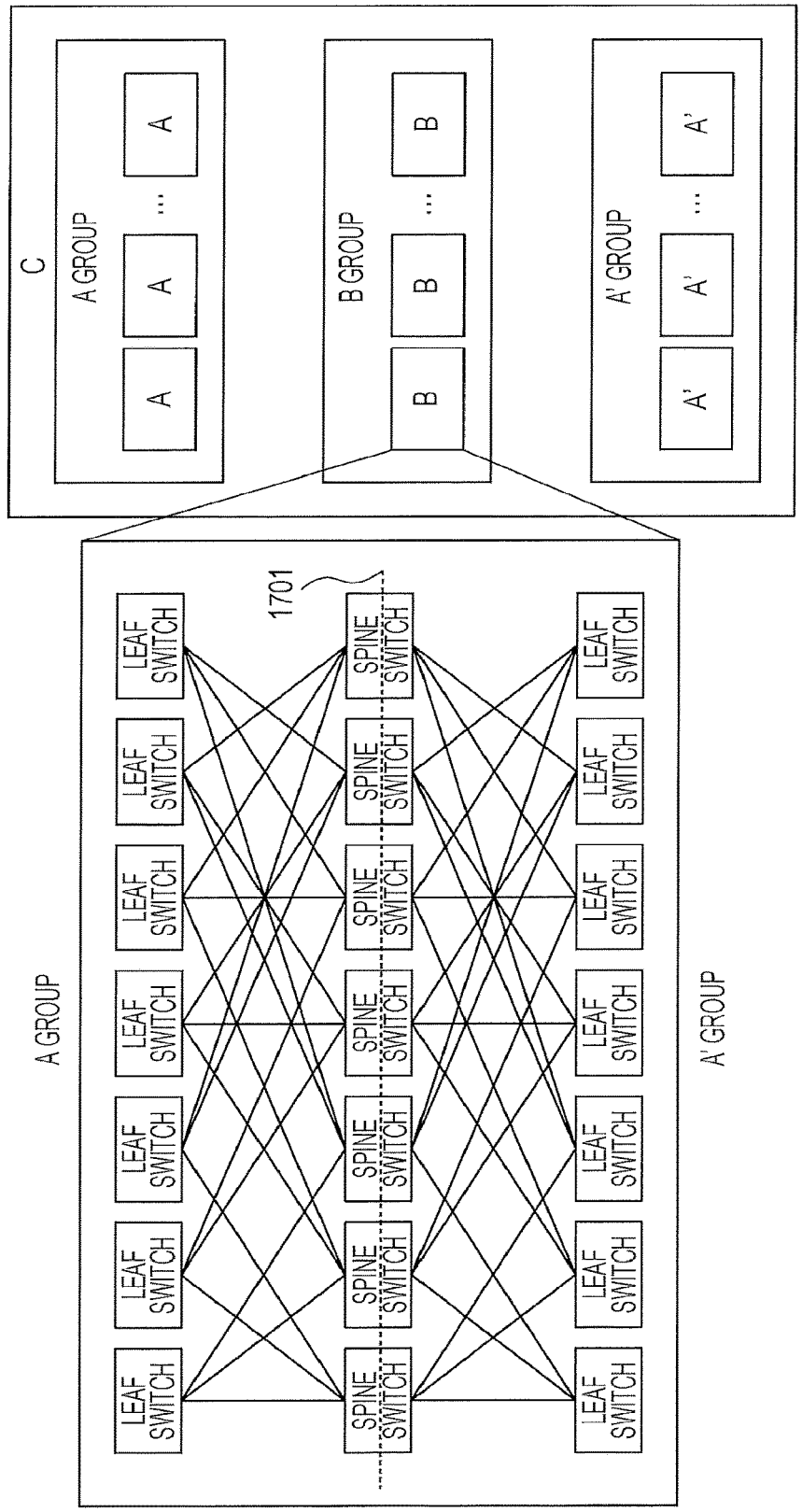
FIG. 17 is a diagram illustrating an example of connection information, according to an embodiment.

FIG. 17 is a diagram illustrating a creation example of connection information 510C in Example 3. In a case where line symmetry is formed with respect to a border of Spine switches at the middle stage in a certain topological structure, the certain topological structure is referred to as a "line-symmetric topological structure". For example, Fat-Tree or latin square Fat-Tree has the line-symmetric topological structure. In the line-symmetric topological structure, if unidirectional All-to-All communication without link congestion is possible, it is possible to create a topological structure in which bidirectional All-to-All communication without link congestion is performed, by causing data to turn back at the Spine switch.

FIG. 17 illustrates an example of a topological structure C in which bidirectional All-to-All communication without link congestion is performed. The topological structure C includes a topological structure A group, a topological structure B group, and a topological structure A' group. Here, a topological structure A' is a topological structure obtained by reversing the topological structure A. The topological structure B is a line-symmetric topological structure. For example, as illustrated in FIG. 13, the topological structure B is a latin square Fat-Tree. As illustrated in FIG. 17, in the latin square Fat-Tree, line symmetry is formed by using a dot line 1701 as an axis. The dot line 1701 is obtained by linking Spine switches to each other.

After the connection information C of the new topological structure C is obtained, m' servers are picked from the constructed topological structure C, where m' is equal to or greater than m which is the number of servers to which a job is desired to be submitted. A picking example of a server in Example 3 will be described with reference to FIG. 18.

Figure 18:
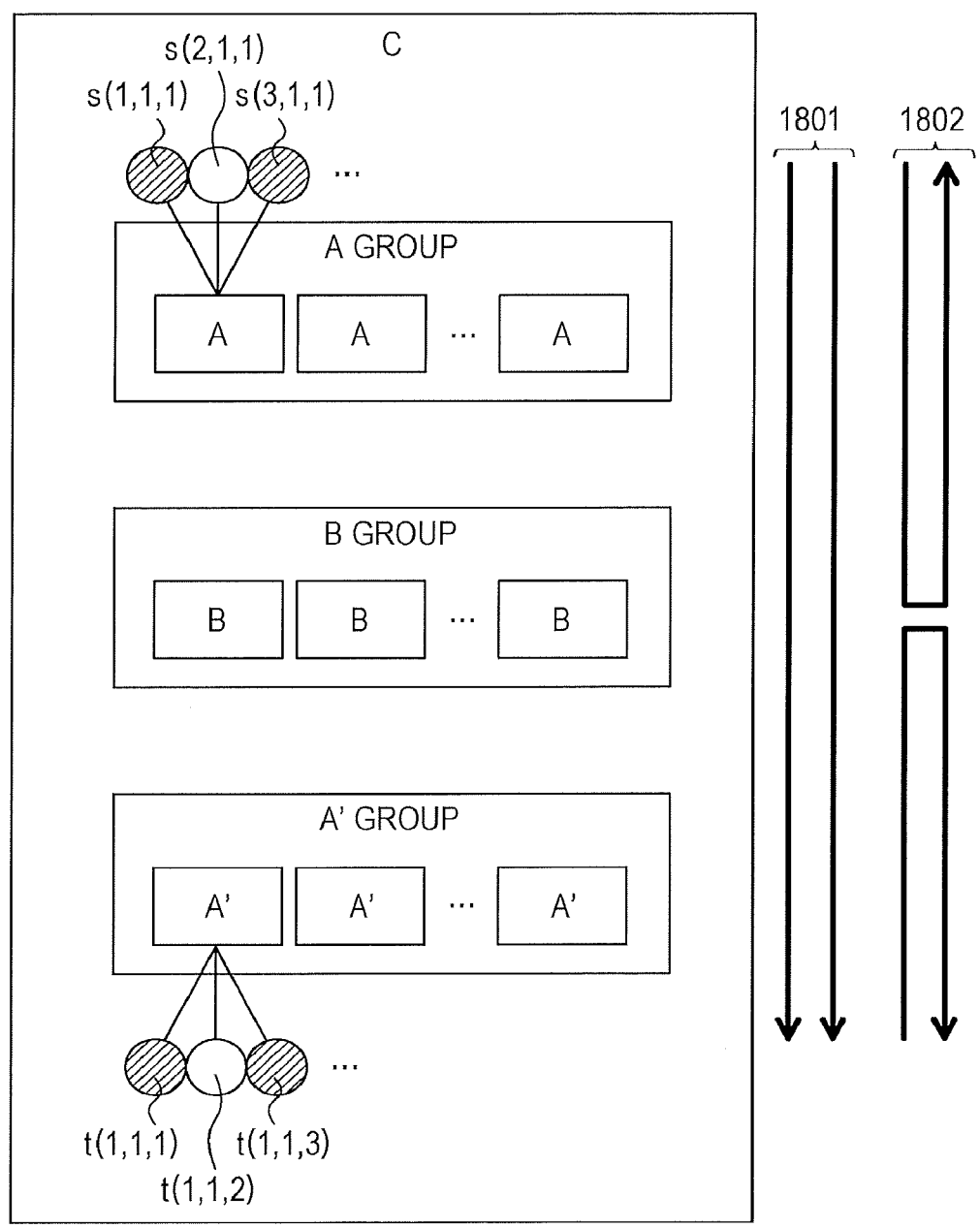
FIG. 18 is a diagram illustrating an example of a piking operation, according to an embodiment.

FIG. 18 is a diagram illustrating an example of picking in Example 3. Picking in Example 3 is also performed in a manner nearly similar to the picking in Example 2. The picking in Example 3 is different from the picking in Example 2 in the following points. That is, in the picking in Example 3, it is desired that the number of pickable servers in the topological structure A is equal to the number of pickable servers in the topological structure A', and port IDs in the topological structure A is also the same as those in the topological structure A'.

Since the number of pickable servers in the topological structure A is equal to the number of pickable servers in the topological structure A', and port IDs in the topological structure A is also the same as those in the topological structure A', it is possible to suppress communication to a server other than the picked servers on paths 1801 and 1802. Here, the paths 1801 are each a path which does not turn back at the Spine switch on the dot line 1701 in FIG. 17, and a path from a picked input server s to a picked output server t. On the contrary, the paths 1802 are each a path which turns back at the Spine switch on the dot line 1701 in FIG. 17, and a path on which a communication from each of picked input servers s or a communication from each of picked output servers t is caused to turn back.

For example, in a topological structure C illustrated in FIG. 18, it is assumed that picked servers are input servers s(1, 1, 1), s(3, 1, 1), . . . , and output servers t(1, 1, 1) and t(1, 1, 3) which are denoted by hatching in FIG. 18. Further, it is assumed that, when data does not turns back at a Spine switch in a certain transfer pattern, the input server s(1, 1, 1) communicates with the output server t(1, 1, 3) and the input server s(3, 1, 1) communicates with the output server t(1, 1, 1). In this case, when data is caused to turn back at a Spine switch in the same transfer pattern, the input server s(1, 1, 1) communicates with the input server s(3, 1, 1) and the output server t(1, 1, 1) communicates with the output server t(1, 1, 3).

As described above, since the number of pickable servers is the same as each other and the port IDs are the same as each other, even if data is caused to turn back at a Spine switch, a communication to a server other than the picked servers is not performed.

In Example 3, in order to perform All-to-All communication without link congestion, the information processing apparatus 101 creates a transfer pattern table and an output port table. Descriptions of the two creation methods will be not repeated because the methods are processes which are substantially similar to that in Example 1. As the different process, in the process of Step S1605, the information processing apparatus 101 specifies the path 1801 and specifies the path 1802. In Steps S1606 and S1608, in which registration in the transfer pattern table 512 and the output port table 513 is performed, the information processing apparatus 101 may prepare a transfer pattern table and an output port table which correspond to each of a case where a communication is not turned back and a case where a communication is turned back.

As described above, the information processing apparatus 101 obtains m' which is the number of servers allowing All-to-All communication, from the number of ports allowing All-to-All communication in a portion of each of the topological structures in the topological structure C, where m' is equal to or greater than m which is the number of servers to which a job is desired to be submitted. The information processing apparatus 101 determines servers to be picked, from port IDs corresponding to m'. This allows the information processing apparatus 101 to perform an operation by picking a portion from the topological structure C.

The information processing apparatus 101 determines the transfer pattern of the topological structure C and output ports of each topological structure, from paths from the respective picking target transmission sources to the transmission destinations, where the paths are specified for each combination of transfer patterns of the topological structures in the topological structure C. Thus, in the topological structure C, each of the picking target transmission sources is able to perform All-to-All communication without link congestion.

The information processing apparatus 101 may obtain m' which is the number of servers allowing All-to-All communication, in an n-stage topological structure. This allows the information processing apparatus 101 to perform an operation by picking a portion also from the n-stage topological structure.

It is assumed that there is a topological structure in which bidirectional All-to-All communication without link congestion is performed. In this case, in the above-described topological structure, the information processing apparatus 101 may determine target picking numbers such that the x-th target picking number where x is a natural number of 1 to ((n−1)/2) has the same value as that of the (n−x+1)th target picking number. This allows the information processing apparatus 101 to perform bidirectional All-to-All communication without link congestion in the above-described topological structure by picking a portion of the above-described topological structure.

The information processing apparatus 101 may suppress the supply of power to at least one of a server other than the picking target servers and a topological structure which is not provided on paths from the picking target transmission sources to the picking target transmission destinations. This allows the information processing apparatus 101 to reduce the power consumption, thereby effectively utilizing resources.

The information processing apparatus 101 may transmit the transfer pattern table 512A to input servers s as the picking target transmission source, and may transmit the output port table 513 to switches in the topological structures on paths from the picking target transmission sources to the picking target transmission destinations. Thus, even though the transfer pattern table 512 or the output port table 513 is not manually set, each of the picking target transmission sources is able to perform All-to-All communication without link congestion in the topological structure C. A manager of the topological structure C may manually assign setting of each of picking target transmission sources and a switch of the topological structure on the above-described paths by viewing the transfer pattern table 512 or the output port table 513.

The information processing method described in the embodiment may be realized by causing a computer such as a personal computer or a workstation to execute a program which has been previously prepared. The program is recorded in a computer-readable recording medium such as a hard disk, a flexible disk, a compact disc-read only memory (CD-ROM), and a digital versatile disk (DVD). The program is read from the recording medium from a computer, and thus is executed. The program may be distributed via a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An apparatus comprising:
a memory configured to store first information and second information related to all-to-all communication in a network in which a first type of topological structures whose number is a second number and a second type of topological structures whose number is a first number are coupled to each other, each of the first type of topological structures including the first number of output ports and the first number of input ports that are respectively coupled to a plurality of transmission sources, each of the second type of topological structures including the second number of output ports that are respectively coupled to a plurality of transmission destinations and the second number of input ports, the first information including a sequence of first picking numbers and a sequence of first identifier (ID)-sets that correspond to the sequence of first picking numbers, respectively, each of the sequence of first picking numbers being equal to or smaller than the first number and indicating a number of first input ports allowing the all-to-all communication without link congestion in each of the first type of topological structures, each of the sequence of first ID-sets including input-port identifiers whose number is equal to corresponding one of the sequence of first picking numbers and which identify the first input ports, the second information including a sequence of second picking numbers and a sequence of second ID-sets that correspond to the sequence of second picking numbers, respectively, each of the sequence of second picking numbers being equal to or smaller than the second number and indicating a number of second output ports allowing the all-to-all communication without link congestion in each of the second type of topological structures, each of the sequence of second ID-sets including output-port identifiers whose number is equal to corresponding one of the sequence of second picking numbers and which identify the second output ports; and
a processor coupled to the memory and configured to:
generate, based on the first information and the second information, an integrated topological structure by combining the first type of topological structures and the second type of topological structures,
upon receiving a target number that is smaller than a product of the first number and the second number and indicates a number of target transmission sources among the plurality of transmission sources to which a job for executing parallel distributed processing is desired to be put, determine a first target picking number from the sequence of first picking numbers, and a second target picking number from the sequence of second picking numbers, with reference to the memory, so that a target picking number indicating a product of the first target picking number and the second target picking number is equal to or greater than the target number, determine picking target transmission sources and picking target transmission destinations between which all-to-all communication is to be performed without link congestion, from the plurality of transmission sources and the plurality of transmission destinations, respectively, based on the first ID-set of input-port identifiers corresponding to the determined first target picking number and the second ID-set of output-port identifiers corresponding to the determined second target picking number, such that a number of the picking target transmission sources and a number of the picking target transmission sources are each equal to the target picking number, configuring, using a portion of the integrated topological structure, a sub network within the network so that the sub network enables all-to-all communication without link congestion between the picking target transmission sources and the picking target transmission destinations, and put the job into the picking target transmission sources to perform all-to-all communication without link congestion in the sub network between the picking target transmission sources and the picking target transmission destinations.

2. The apparatus of claim 1, wherein
the memory is further configured to:
store connection information indicating a connection relationship among topological structures in the network,
store, for each first picking number in the sequence of first picking numbers, the each first picking number of first transfer patterns each indicating combinations of input ports and output ports for performing all-to-all communication without link congestion in the first type of topological structure, and
store, for each second picking number in the sequence of second picking numbers, the each second picking number of second transfer patterns each indicating combinations of input ports and output ports for performing all-to-all communication without link congestion in the second type of topological structure; and the processor is further configured to:
when one of combinations between the first target picking number of first transfer patterns and the second target picking number of second transfer patterns is designated in the network indicated by the connection information, specifies a path from each of the picking target transmission sources to each of the picking target transmission destinations in accordance with the designated combination, and
determine, based on the specified path, a target transfer pattern allowing all-to-all communication from each of the picking target transmission sources to each of the picking target transmission destinations to be performed without link congestion in the network, and determine an output port of each of the topological structures in the network, which corresponds to a combination between each of the picking target transmission sources and each of the picking target transmission destinations.

3. The apparatus of claim 1, wherein
the network is configured to include n topological structures from the first type of topological structures to n-th type of topological structures where n is a natural number of 2 or more, each of i-th type of topological structures including an i-th number of input ports and the i-th number of output ports where i is a natural number of 1 to n, the plurality of transmission sources being coupled to the input ports of the first type of topological structures, respectively, the plurality of transmission destinations being coupled to the output ports of the n-th type of topological structures, respectively;

the memory is configured to store n pieces of information from the first information to n-th information, i-th information including a sequence of i-th picking numbers and a sequence of i-th ID-sets that correspond to the sequence of i-th picking numbers, respectively, each of the sequence of i-th picking numbers being equal to or smaller than the i-th number and indicating a number of i-th input ports allowing the all-to-all communication without link congestion in each of the i-th type of topological structures, each of the sequence of i-th ID-sets including input-port identifiers whose number is equal to corresponding one of the sequence of i-th picking numbers and which identify the i-th input ports; and the processor is configured to:
in a case where the all-to-all communication is performed via the network without link congestion between m transmission sources and m transmission destinations where m is an natural number smaller than a product of the first number to n-th number, determine an i-th target picking number from the sequence of i-th picking numbers for each i from 1 to n, with reference to the memory, so that a product of the first target picking number to n-th target picking number is equal to or greater than m, and
determine the picking target transmission sources and the picking target transmission destinations between which the all-to-all communication is to be performed without link congestion, from the plurality of transmission sources and the plurality of transmission destinations, based on the i-th ID-set of input-port identifiers corresponding to the determined i-th target picking number for each i from 1 to n.

4. The apparatus of claim 3, wherein
any one of the j-th type of topological structures included in the network is a topological structure obtained by reversing any one of a (n−j+1)th type of topological structures where n is an odd number of 3 or more and j is a natural number of 1 to ((n−1)/2);
((n+1)/2)th type of topological structure includes a plurality of switches which are coupled to each other, and has a structure of forming a line symmetry with respect to an axis formed by a line linking the plurality of switches to each other;
an ID-set of the sequence of j-th ID-sets that corresponds to an j-th picking number in the sequence of j-th picking numbers for the j-th type of topological structures is identical with an ID-set of the sequence of (n−j+1)th ID-sets, which corresponds to any one of the sequence of (n−j+1)th picking numbers which is equal to the j-th picking number in the sequence of j-th picking numbers; and
in a case where the all-to-all communication is performed via the network without link congestion between the m transmission sources and the m transmission destinations where m is an natural number smaller than a product of the first number to n-th number, the processor determines the i-th target picking number from the sequence of i-th picking numbers for each i from 1 to n, with reference to the memory, so that a product of the first target picking number to n-th target picking number is equal to or greater than m, and so that the x-th target picking number in the sequence of x-th picking numbers is identical to the (n−x+1)th target picking number in the sequence of (n−j+1)th picking numbers where x is a natural number from 1 to ((n−1)/2).

5. The apparatus of claim 1, wherein
the processor is further configured to suppresses a supply of power to at least one of a group of transmission sources other than the picking target transmission sources among the plurality of transmission sources, a group of transmission destinations other than the picking target transmission destinations among the plurality of transmission destinations, and a group of switches which are included in a topological structure that is not provided on paths from the picking target transmission sources to the picking target transmission destinations, among topological structures included in the network.

6. The apparatus of claim 1, wherein
the processor is further configured to:
  transmit a transfer pattern for performing all-to-all communication from the picking target transmission sources to the picking target transmission destinations in the network without link congestion, to each of the picking target transmission sources, and
  transmit information on output ports that correspond to combinations of the transmission sources and the transmission destinations and included in each of topological structures on paths from the picking target transmission sources to the picking target transmission destinations, to a group of switches included in the each topological structure.

7. A method comprising:
providing first information and second information related to all-to-all communication in a network in which a first type of topological structures whose number is a second number and a second type of topological structures whose number is a first number are coupled to each other, each of the first type of topological structures including the first number of output ports and the first number of input ports that are respectively coupled to a plurality of transmission sources, each of the second type of topological structures including the second number of output ports that are respectively coupled to a plurality of transmission destinations and the second number of input ports, the first information including a sequence of first picking numbers and a sequence of first identifier (ID)-sets that correspond to the sequence of first picking numbers, respectively, each of the sequence of first picking numbers being equal to or smaller than the first number and indicating a number of first input ports allowing the all-to-all communication without link congestion in each of the first type of topological structures, each of the sequence of first ID-sets including input-port identifiers whose number is equal to corresponding one of the sequence of first picking numbers and which identify the first input ports, the second information including a sequence of second picking numbers and a sequence of second ID-sets that correspond to the sequence of second picking numbers, respectively, each of the sequence of second picking numbers being equal to or smaller than the second number and indicating a number of second output ports allowing the all-to-all communication without link congestion in each of the second type of topological structures, each of the sequence of second ID-sets including output-port identifiers whose number is equal to corresponding one of the sequence of second picking numbers and which identify the second output ports;

generating, based on the first information and the second information, an integrated topological structure by combining the first type of topological structures and the second type of topological structures;

upon receiving a target number that is smaller than a product of the first number and the second number and indicates a number of target transmission sources among the plurality of transmission sources to which a job for executing parallel distributed processing is desired to be put, determining a first target picking number from the sequence of first picking numbers, and a second target picking number from the sequence of second picking numbers, with reference to the memory, so that a target picking number indicating a product of the first target picking number and the second target picking number is equal to or greater than the target number;

determining picking target transmission sources and picking target transmission destinations between which all-to-all communication is to be performed without link congestion, from the plurality of transmission sources and the plurality of transmission destinations, respectively, based on the first ID-set of input-port identifiers corresponding to the determined first target picking number and the second ID-set of output-port identifiers corresponding to the determined second target picking number, such that a number of the picking target transmission sources and a number of the picking target transmission sources are each equal to the target picking number;

configuring, using a portion of the integrated topological structure, a sub network within the network so that the sub network enables all-to-all communication without link congestion between the picking target transmission sources and the picking target transmission destinations; and putting the job into the picking target transmission sources to perform all-to-all communication without link congestion in the sub network between the picking target transmission sources and the picking target transmission destinations.

8. A non-transitory, computer-readable recording medium having stored therein a program for causing a computer to execute a process comprising:
providing first information and second information related to all-to-all communication in a network in which a first type of topological structures whose number is a second number and a second type of topological structures whose number is a first number are coupled to each other, each of the first type of topological structures including the first number of output ports and the first number of input ports that are respectively coupled to a plurality of transmission sources, each of the second type of topological structures including the second number of output ports that are respectively coupled to a plurality of transmission destinations and the second number of input ports, the first information including a sequence of first picking numbers and a sequence of first identifier (ID)-sets that correspond to the sequence of first picking numbers, respectively, each of the sequence of first picking numbers being equal to or smaller than the first number and indicating a number of first input ports allowing the all-to-all communication without link congestion in each of the first type of topological structures, each of the sequence of first ID-sets including input-port identifiers whose number is equal to corresponding one of the sequence of first picking numbers and which identify the first input ports, the second information including a sequence of second picking numbers and a sequence of second ID-sets that correspond to the sequence of second picking numbers, respectively, each of the sequence of second picking numbers being equal to or smaller than the second number and indicating a number of second output ports allowing the all-to-all communication without link congestion in each of the second type of topological structures, each of the sequence of second ID-sets including output-port identifiers whose number is equal to corresponding one of the sequence of second picking numbers and which identify the second output ports;

generating, based on the first information and the second information, an integrated topological structure by combining the first type of topological structures and the second type of topological structures;

upon receiving a target number that is smaller than a product of the first number and the second number and indicates a number of target transmission sources among the plurality of transmission sources to which a job for executing parallel distributed processing is desired to be put, determining a first target picking number from the sequence of first picking numbers, and a second target picking number from the sequence of second picking numbers, with reference to the memory, so that a target picking number indicating a product of the first target picking number and the second target picking number is equal to or greater than the target number;

determining picking target transmission sources and picking target transmission destinations between which all-to-all communication is to be performed without link congestion, from the plurality of transmission sources and the plurality of transmission destinations, respectively, based on the first ID-set of input-port identifiers corresponding to the determined first target picking number and the second ID-set of output-port identifiers corresponding to the determined second target picking number, such that a number of the picking target transmission sources and a number of the picking target transmission sources are each equal to the target picking number;

configuring, using a portion of the integrated topological structure, a sub network within the network so that the sub network enables all-to-all communication without link congestion between the picking target transmission sources and the picking target transmission destinations; and putting the job into the picking target transmission sources to perform all-to-all communication without link congestion in the sub network between the picking target transmission sources and the picking target transmission destinations.

* * * * *